United States Patent
Satoh et al.

(10) Patent No.: US 7,125,926 B2
(45) Date of Patent: Oct. 24, 2006

(54) SURFACE TREATMENT AGENT COMPRISING INORGANIC-ORGANIC HYBRID MATERIAL

(75) Inventors: Kazuyuki Satoh, Settsu (JP); Mihoko Sakai, Settsu (JP); Takayuki Araki, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 10/472,377

(22) PCT Filed: Mar. 20, 2002

(86) PCT No.: PCT/JP02/02646

§ 371 (c)(1),
(2), (4) Date: Apr. 8, 2004

(87) PCT Pub. No.: WO02/077116

PCT Pub. Date: Oct. 3, 2002

(65) Prior Publication Data

US 2004/0186216 A1    Sep. 23, 2004

(30) Foreign Application Priority Data

Mar. 21, 2001    (JP) .............................. 2001-080352

(51) Int. Cl.
*C08L 1/00* (2006.01)

(52) U.S. Cl. ..................... 524/502; 152/409.1; 428/421

(58) Field of Classification Search ................ 524/502; 152/209.1; 428/421
See application file for complete search history.

(56) References Cited

U.S. PATENT DOCUMENTS 6,129,980 A * 10/2000 Tsukada et al. ............. 428/327

6,620,493 B1 *  9/2003 Hasegawa et al. .......... 428/220
6,873,387 B1 *  3/2005 Hokazono et al. .......... 349/137
2003/0102286 A1   6/2003 Takahara et al.

FOREIGN PATENT DOCUMENTS

| EP | 0 278 060 A2 | 8/1988 |
| EP | 0 513 690 A2 | 11/1992 |
| EP | 513690 A2 | 11/1992 |
| EP | 0 749 021 A2 | 12/1996 |
| EP | 0 844 265 A1 | 5/1998 |
| EP | 844265 A1 | 5/1998 |
| EP | 0 953 584 A1 | 11/1999 |
| JP | 60-156731 | 8/1985 |
| JP | 60-156731 A | 8/1985 |
| JP | 10-104403 A | 4/1988 |
| JP | 64-1527 | 1/1989 |
| JP | 64-86101 | 3/1989 |

(Continued)

OTHER PUBLICATIONS

International Search Report for PCT/JP02/02646 dated Jun. 25, 2003 (with english translation), cited on IDS of Dec. 29, 2003 and Apr. 8, 2004.*

(Continued)

*Primary Examiner*—David W. Wu
*Assistant Examiner*—Henry S. Hu
(74) *Attorney, Agent, or Firm*—Sughrue Mion, PLLC

(57) ABSTRACT

A surface treatment agent, which contains:
(A) a hydrolyzable metal alkoxide or a hydrolyzate thereof,
(B) a fluorocompound containing a perfluoroalkyl group and a functional group reactive with the hydrolyzable metal alkoxide (A), and
(C) an adhesion improvement agent,
can provide a film having transparency and durability while maintaining excellent soil releasability and low refractive index.

11 Claims, 4 Drawing Sheets

Example 7

FOREIGN PATENT DOCUMENTS

| | | |
|---|---|---|
| JP | 4-338901 | 11/1992 |
| JP | 6-29332 | 4/1994 |
| JP | 6-115023 | 4/1994 |
| JP | 6-256756 | 9/1994 |
| JP | 6-256756 A * | 9/1994 |
| JP | 7-126552 | 5/1995 |
| JP | 9-61605 | 3/1997 |
| JP | 10-104403 | 4/1998 |
| JP | 2000-17028 | 1/2000 |
| JP | 2001-42102 | 2/2001 |
| JP | 2001-42102 A | 2/2001 |
| JP | 2001-272505 | 10/2001 |

OTHER PUBLICATIONS

International Search Report for PCT/JP02/02646 dated Jun. 25, 2002.

Amir Ershad, et al. "Hydrophobic Hybrid Inorganic—Organic Thin Film Prepared by Sol-Gel Process for Glass Protection and Strengthening Applications" Journal of Applied Polymer Science, vol. 65, 2387-2393 (1997).

C.J. Brinkler, et al. "SOL-GEL Thin Film Formation" Journal of Non-Crystalline Solids 121 (1990) 294-302.

English translation of International Preliminary Examination Report for PCT/JP02/02646 dated Jan. 22, 2003.

* cited by examiner

SURFACE TREATMENT AGENT COMPRISING INORGANIC-ORGANIC HYBRID MATERIAL

FIELD OF THE INVENTION

The present invention relates to a surface treatment agent which is soluble in an organic solvent and imparts superior soil releasability and water repellency. Particularly it relates to a photo-curable composition which can form a cured film having excellent weatherability, thermal resistance, transparency and scratch resistance under excellent photo-curability on surfaces having various shapes, such as plastics, metals, ceramics, quartz glass, glass, silicones, oxidized silicones, woods, papers and fibers and which has preservation stability and to a cured film thereof.

Thus, the thermosetting composition of the present invention, the cured film or cured material therefrom are suitable for a paint for metal, a sizing agent such as a slate material, a hard coating of a plastic film, a hard coating of a print paper, a stain-proofing film for a floor, a wall tile and a fiber, a hard coating of an optical lens, a protective film of a display device, an antireflective film, a highly reflective film, a selective transmission film, a coverage reinforcing material of a fiber, a resin for an optical three-dimensional shaping, an optical lens, a semiconductor sealing material, a semiconductor insulation film, a semiconductor adhesive, an optical adhesive, a printing plate material, an actuator, an optical fiber, a pellicle, a wavelength division multiplex (WDM) transmission system, an optical communication system material for noise filtering, a resist material, a printer head ink water-repellent film, a flame retardant material, an optical filter, an optical filter for solar cell, an antireflective film for laser, and a photonics material such as an optical waveguide material and optical switching material.

RELATED ART

Recently, various developments can be seen on various display devices, associating with developments of multimedia. Among various display devices, the improvement of visibility in devices which are used outdoor, particularly mobile devices, are increasingly important, and the easy visibility also in large display devices is required by the users. These matters as such are technical problems.

Hitherto, as one means for improving the visibility of display devices, an antireflective film made of a low refractive index material is coated on a substrate of the display device. As the methods of forming the antireflective film, known is a method of forming a thin film of, for example, fluorocompound by a vapor deposition. Recently, sought is a technology capable of forming the antireflective film in devices, particularly liquid crystal display devices, with a low cost, also in large display devices. However, it is difficult for the vapor deposition method to form a homogeneous antireflective film in high efficiency on a large area substrate and to decrease the cost due to the necessity of a vacuum apparatus.

Under these circumstances, studied is a method of forming an antireflective film by dissolving a fluoropolymer having a low refractive index into an organic solvent, preparing a liquid composition, and coating the composition on a substrate surface. For example, JP-A-64-1527 proposes that a fluorinated alkyl silane is coated on substrate surface and JP-A-6-115023 proposes that a fluoropolymer having a specific structure is coated. In addition, JP-A-7-126552 proposes a method of coating a ultraviolet light-curable fluorine-containing material and JP-A-2000-17028 proposes a method of coating an organic and inorganic hybrid fluoropolymer. However, these materials have insufficient soil releasability, low-refractive index and scratch resistance, since multiple layers of a fluorine-containing component and a fluorine-free component are not possessed.

J. Applied Polymer Science, 65 (12), 2387 (1997) discloses that the provision of a hydrophobic inorganic and organic hybrid material thin film on glass can impart the water repellency and the glass protection. However, this hybrid material has insufficient water repellency and antireflectivity and soil releasability.

Generally, when a person uses the display device, a finger soil, a fingerprint, a sweat, a cosmetics and the like are adhered to a display screen. For example, when the antireflection film is formed, a soil caused by the adhesion is easily outstanding, and said soil cannot be easily removed. In order to prevent the soil or to easily wipe off the soil, a soil release layer is devised to be provided on a surface of the antireflective film. For example, JP-A-64-86101 proposes an antireflective article having soil releasability and scratch resistance, wherein an antireflective film mainly made of silicon dioxide is provided on a substrate surface and an antireflective film surface is treated with a compound containing an organic silicon substituent. JP-A-4-338901 proposes a CRT filter having soil releasability and scratch resistance wherein a terminal silanol organic polysiloxane is coated on an antireflective film. In addition, JP-B-6-29332 proposes a low-reflection plastic having low reflectivity and soil releasability wherein an antireflective film comprising a mono- or di-silane compound containing a polyfluoroalkyl group and a silane compound containing a halogen atom, an alkyl group or an alkoxy group is laminated on a plastic surface.

However, the surface treatment agents formed by these conventional methods can give a specific soil releasability and antireflectivity which are not sufficient. Since the adhered soil cannot be easily wiped off, it is necessary to use water and/or an organic solvent for the removal. Since this wiping off can easily peel off a substance exhibiting the soil releasability, the durability of the soil releasability is poor. Said fluorine-containing coating materials give insufficient scratch resistance of the resultant coating so that particularly when the coating is repeatedly rubbed, the coating is peeled off. In addition, unreacted acrylic monomers and polyfunctional acrylic compounds are easily remains in the coating film so that the cured coating film has poor properties. In addition, if the fluorine content is intended to be increased, a surface active agent such as a reactive emulsifier must be disadvantageously introduced into the composition. In order to exhibit excellent soil releasability and transparency, and low refractive index and excellent antireflective property as well as excellent scratch resistance, a multi-layered coating is essential so that coating once cannot form a fluorine-containing multi-layered structure, thus the preparation process is disadvantageously complicated.

Generally, a method of forming an antireflective film comprising a thin film on an optical substrate comprises forming a single layer or a plurality of layers. The method is performed in many years, and a thin film is generally prepared by a film formation procedure such as a vacuum deposition of inorganic material.

If the number of layers in the thin film is small, it is difficult to obtain the antireflective effect for a light having a wide wavelength range, because the refractive index of the thin film is definitely determined. In order to obtain the antireflective effect over a wide wavelength range, it is necessary that the refractive index of the film is made gradient by continuously distributing the refractive index. Hitherto, a method of forming an graded refractive index distribution includes that a plurality of thin films are formed or a porous film is formed.

Also in order to prevent the reflective index from changing depending on an incident angle, it was necessary that larger number of thin layers are laminated or porous film is formed. That is, the light amount depending on the incident angle of light can be controlled by film formation.

Basically, the antireflective film counteracts the reflection light by utilizing the interference of light, and it is necessary to finely control the refractive index of material and the film thickness when a thin film is formed. Depending on increasing the number of layers of thin film and on making the thin film porous, disadvantageously, the productivity is decreased, the substrate is curved and the mechanical strength is deteriorated.

As described in, for example, JP-A-2001-272505, there is a cop-shaped antireflective film which has fine concave and convex on an optical device surface, that is, a volume ratio of the optical element side to the air side that continuously changes. Also in J. Non-Cryst. Solid, 121 (1990) 294–302, there is a cop-shaped antireflective film which has a volume ratio of the optical element side to the air side that continuously changes. However, because these antireflective films contain no fluorine and have the concave-convex structure, the soil releasability and the durability against mechanical strength is not sufficient.

SUMMARY of THE INVENTION

The present invention was carried out under such a background. One object of the present invention is to provide a surface treatment agent, soluble in general hydrocarbons, which can continuously form a coating film having excellent soil releasability and transparency and low refractive index and exhibiting excellent ant-reflective effect, and which is excellent in scratch resistance and soil releasability. Other object of the present invention is to provide a surface treatment agent excellent in soil releasability and transparency as well as scratch resistance. Further object of the present invention is to provide an antireflective film having these properties.

The present invention provides a antireflective film having the refractive index continuously changing based on the its tissue, since the surface treatment agent contains a fluorocompound and contains compounds having different refractive indexes which are complexed in a nanoscale. This antireflective film can easily exhibit the low reflectance property over a wide wavelength range by the coating, different from a conventional cop-shaped antireflective film. In addition, since the film is coated on the surface with the fluorocompound, the film has, for example, no adhesion of finger print so that the soil releasability is excellent and the film is in a monolithic structure so that the film can exhibit the durability against an external mechanical force.

The surface treatment agent of the present invention comprises:
(A) a hydrolyzable metal alkoxide or a hydrolyzate thereof,
(B) a fluorocompound containing a perfluoroalkyl group and a functional group reactive with the hydrolyzable metal alkoxide (A), and
(C) an adhesion improvement agent.

The present invention also provides an optical article coated with a transparent film, which has:

(i) a region having a continuous wavelength range of at least 100 nm exhibiting a reflectance of at most 20% in the reflectance characters viewed from a coating side at a 150 to 1,600 nm wavelength range, and
(ii) a surface free energy of the film surface of at least 6.0 mJ/m².

This optical article can be prepared by coating a surface treatment agent comprising:
(A-1) a hydrolyzable metal alkoxide or a hydrolyzate thereof, and
(B-1) an organic compound containing a fluorine atom, on the substrate. The coating may be a plurality of times (for example, twice to ten times) and is preferably one time (that is, one coating).

DETAILED EXPLANATION OF THE INVENTION

Figure 1:
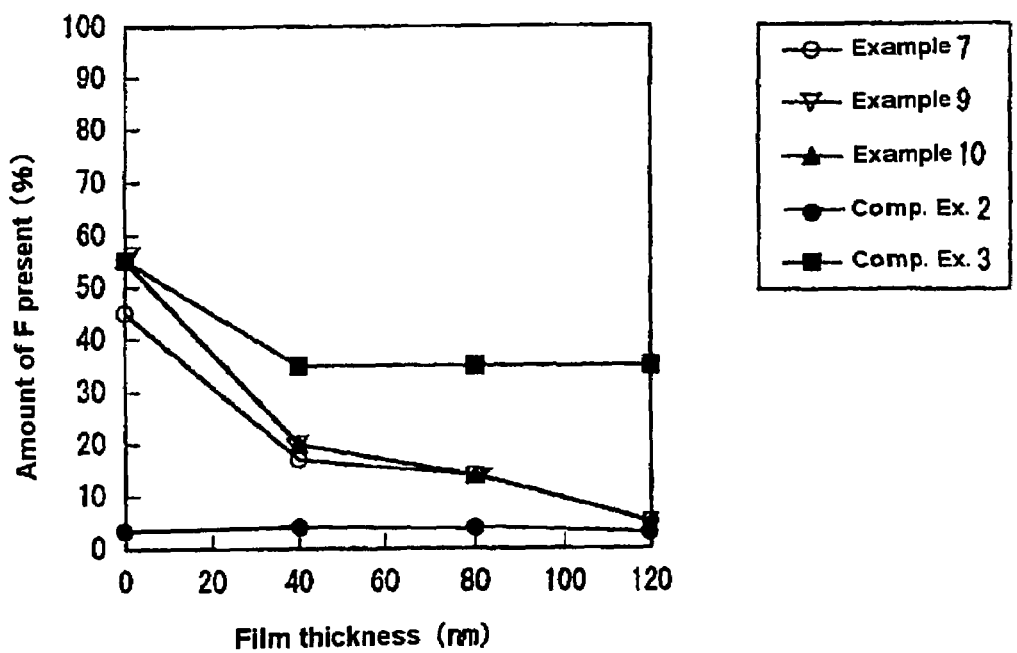
FIG. 1 shows a graph showing the presence amount of a fluorine atom in depth direction of the film measured by an X-ray photoelectron spectroscopy for the coating films obtained in Examples 7, 9 and 10 and Comparative Examples 2 and 3.

The surface treatment agent of the present invention comprising the components (A) to (C) is excellent in soil releasability and transparency and can give a surface treatment coating and an antireflective film having excellent scratch resistance.

The component (A) is preferably a hydrolyzable metal alkoxide of the general formula (1) or a hydrolyzate thereof:

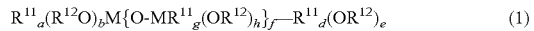
$$R^{11}{}_a(R^{12}O)_bM\{O\text{-}MR^{11}{}_g(OR^{12})_h\}_f\text{---}R^{11}{}_d(OR^{12})_e \qquad (1)$$

wherein each $R^{11}$ is an alkyl group, a methacryloxy group, acryloxy group, a vinyl group-containing organic group, an aryl group, an amino group, a glycidyl group, an isocyanate group, or a carboxyl group-containing organic group, each $R^{12}$ is an alkyl group, an alkoxyalkyl group, or an aryl group, M is a metal, a is from 0 to 3, b is from 0 to 4, a+b is from 2 to 4, d is 1 or 0, e is 1 or 0, d+e is 1, f is from 0 to 10, for example, from 0 to 4, g is 0 to 3, h is 0 to 3, g+h is from 1 to 3, at least one of b, e and h is at least 1. The carbon number of $R^{11}$ and $R^{12}$ may be from 1 to 18 (The carbon number may be from 6 to 18, if they contain the aryl group).

The component (A) may be a cage-like silsesquioxane, for example, a compound of the following structure.

$$\text{(cage-like silsesquioxane structure with 8 Si atoms connected by O bridges, each Si bearing an R group)}$$

wherein R is an aliphatic hydrocarbon group (for example, an alkyl group having 1 to 5 carbon atoms, particularly a methyl group) or an aromatic hydrocarbon group (for example, a phenyl group), or a group containing an acryloyl group, a methacryloyl group or an oxetane group.

The fluorocompound (B) contains the perfluoroalkyl group and has the functional group reacting with the hydrolyzable metal alkoxide (A). Examples of said functional group include an alkoxysilane group, a carboxyl group, a hydroxyl group, an epoxy group, a phosphate group, a halogenated silyl group, a sulfone group, an amino group, an isocyanate group and a blocked isocyanate group.

The component (B) is preferably a perfluoroalkyl group-containing hydrolyzable metal alkoxide of the general formula (2):

$$Rf\text{—}(OCF_2CF_2CF_2)_a\text{—}(OCFCF_2)_b\text{—}(OCF_2)_c\text{—}*$$
$$\phantom{Rf\text{—}(OCF_2CF_2CF_2)_a\text{—}(O}|\phantom{CF_2)_b\text{—}(OCF_2)_c\text{—}*}$$
$$\phantom{Rf\text{—}(OCF_2CF_2CF_2)_a\text{—}(O}CF_3$$

$$*\text{—}(OCF_2CF_2)_d\text{—}OCF(CF_2)_e\text{—}\left[CH_2C\begin{array}{c}Y\\|\\|\\Z\end{array}\begin{array}{c}\\(CH_2)_m\text{—}M\text{—}(R^1)_{3-n}\\|\\(R^2)_n\end{array}\right]_p\text{—}X$$

wherein Rf is a linear or branched perfluoroalkyl group having 1 to 16 carbon atoms, X is an iodine atom or a hydrogen atom, Y is a hydrogen atom or a lower alkyl group (for example, an alkyl group having 1 to 8 carbon atoms), Z is a fluorine atom or a trifluoromethyl group, $R^1$ is a hydrolyzable group, or a chlorine atom, $R^2$ is a hydrogen atom or a inert monovalent organic group, a, b, c and d are an integer of from 0 to 200, e is 0 or 1, m and n are from 0 to 2, p is an integer of from 1 to 10, M is a metal, or a reactive group selected from the group consisting of an isocyanate group, a carboxyl group, a hydroxyl group, a glycidyl group, a phosphate group, a sulfonate group and an amino group, or a hydrolyzate thereof.

The hydrolyzable metal alkoxide and the like of the component (B) easily hydrolyzes to easily react with the hydrolyzable metal alkoxide (A)

The component (C) has a surface free energy of at least 10 $mJ/m^2$, for example, at least 15 $mJ/m^2$, particularly at least 20 $mJ/m^2$, especially at least 30 $MJ/m^2$. The component (C) is preferably a polymer based on a fluorine-free olefin, having a number-average molecular weight of at least 500, for example, at least 1,000. The fluorine-free olefin polymer is suitable as the agent for adhesion to the substrate, because it can exhibit excellent adhesion to a resin such as plastics.

The component (C) is preferably a polymer having a polysiloxane segment having a number-average molecular weight of at least 500, for example, at least 1,000 in a side chain of a polyolefin polymer having a number-average molecular weight of at least 500, for example, at least 1,000. Because the polysiloxane segment can improve the scratch resistance, it is suitable as a sliding agent.

The surface treatment agent of the present invention preferably contains (D) a fluoropolymer in addition to the components (A) to (C). The fluoropolymer (D) preferably has a group reacting with the component (A), for example, an alkoxysilane group, a carboxyl group, a hydroxyl group, an amino group, a glycidyl group, an isocyanate group and a blocked isocyanate group.

Since the fluoropolymer (D) can exhibit lower refractive index and more excellent antireflective property and can easily dissolve in a common hydrocarbon solvent even in a high concentration, it is not necessary to introduce a surfactant such as a reactive emulsifier into the surface treatment composition.

The fluoropolymer (D) is preferably a polymer having a number-average molecular weight of at least 500, of the general formula (3):

$$\text{-}(M)_x\text{-}(N)_y\text{—}$$

wherein x and y are from 1 to 500, the structural unit M is derived from a fluorine-containing ethylenic monomer of the formula (M):

$$\text{—}(CX^1X^2\text{—}CX^3)\text{—} \tag{M}$$
$$\phantom{\text{—}(CX^1X^2\text{—}C}|$$
$$\phantom{\text{—}(CX^1X^2\text{—}}(CX^4X^5)_a\text{—}(C=O)_b\text{—}(O)_c\text{—}Rf^1$$

(in which, $X^1$ and $X^2$ are, the same or different, H or F, $X^3$ is H, F, $CH_3$ or $CF_3$, $X^4$ and $X^5$ are, the same or different, H, F or $CH_3$, $Rf^1$ is an organic group wherein 1 to 3 $y^3$ groups ($Y^3$ is a hydroxyl group, a glycidyl group, an amino group, an alkoxy group, a carboxyl group, an isocyanate group, or $C_1$–$C_{10}$ monovalent organic group having at least one of these reactive groups) are bonded to a $C_1$–$C_{40}$ fluorine-containing alkyl group or a $C_2$–$C_{100}$ fluorine-containing alkyl group having an ether linkage, a is an integer of from 0 to 3, b and c are, the same or different, 0 or 1, the structural unit N is a structural unit obtained by reacting (for example, esterifying) an unsaturated carboxylic acid of the formula (A) or a derivative thereof:

$$HOOC\text{—}(R^1)_f\text{—}CX^6=CX^7X^8 \tag{A}$$

(in which $R^1$ is a divalent organic group having 1 to 7 carbon atoms, which may be substituted with a fluorine atom, $X^6$ is H, F, $CH_3$ or $CF_3$, $X^7$ and $X^8$ are, the same or different, H or F, f is 0 or 1)

with the $y^3$ group in the $Rf^1$ group of the ethylenic monomer giving the structural unit M.

Preferably, the polymer of the general formula (3) is preferably a fluoropolymer which contains 0.1 to 99.9% by mol of the structural unit M and 0.1 to 99.9% by mol of structural unit N, and which has a number-average molecular weight of 500 to 1,000,000.

<Hydrolyzable Metal Alkoxide (A)>

Preferably, the surface treatment agent of the present invention contains the hydrolyzable metal alkoxide (A) of the general formula (1), and the component (A) contains at least one alkoxy group.

The component (A) may be a compound of the general formula (1):

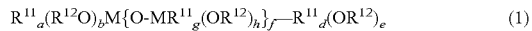
$$R^{11}{}_a(R^{12}O)_bM\{O-MR^{11}{}_g(OR^{12})_h\}_f-R^{11}{}_d(OR^{12})_e \quad (1)$$

wherein each $R^{11}$ is an alkyl group, a methacryloxy group, acryloxy group, a vinyl group-containing organic group, an aryl group, an amino group, a glycidyl group, an isocyanate group, or a carboxyl group-containing organic group, each $R^{12}$ is an alkyl group, an alkoxyalkyl group, or an aryl group, M is a metal, a is from 0 to 3, b is from 0 to 4, a+b is from 2 to 4, d is 1 or 0, e is 1 or 0, d+e is 1, f is from 0 to 10, for example, from 0 to 4, g is 0 to 3, h is 0 to 3, g+h is from 1 to 3, at least one of b, e and h is at least 1.

The hydrolyzable metal alkoxide (A) may be, for example, a compound of the general formula:

$$(R^{11})_nM(OR^{12})_m$$

wherein each of $R^{11}$ is an alkyl group, a methacryloxy group, an acryloxy group, a vinyl group-containing organic group, an aryl group, an amino group, a glycidyl group, an isocyanate group, or a carboxyl group-containing organic group, each of $R^{12}$ is an alkyl group, an alkoxyalkyl group, or an aryl group, M is a metal, m is from 2 to 5, particularly 3 or 4,
n is from 0 to 2, particularly 0 or 1,
m+n is from 3 to 5, particularly 4.

The number of the alkoxy groups in the hydrolyzable metal alkoxide (A) may be from 1 to 12, for example, from 1 to 4.

The number of carbon atoms in the alkyl group ($R^{11}$ and $R^{12}$) is, for example, from 1 to 6. The number of carbon atoms in the aryl groups is, for example, from 6 to 18. The number of carbon atoms in the vinyl group-containing organic group and the glycidyl group-containing organic group is, for example, from 2 to 6. Examples of the vinyl group-containing organic group include a vinyl group. Examples of the glycidyl group-containing organic group include an epoxy group. In the alkoxyalkyl group, the carbon number of the alkoxy group is, for example, from 1 to 6, and the carbon number of the alkyl group is, for example, from 1 to 6.

Examples of M (metal) are silicon (Si), titanium (Ti), aluminum (Al), zirconium (Zr), tin (Sn), iron (Fe), sodium (Na), magnesium (Mg), phosphorus (P), sulfur (S), potassium (K), calcium (Ca), scandium (Sc), vanadium (V), chromium (Cr), manganese (Mn), cobalt (Co), nickel (Ni), copper (Cu), zinc (Zn), gallium (Ga), germanium (Ge), arsenic (As), selenium (Se), rubidium (Rb), strontium (Sr), yttrium (Y), niobium (Nb), molybdenum (Mo), cadmium (Cd), indium (In), antimony (Sb), tellurium (Te), cesium (Cs), barium (Ba), lanthanum (La), hafnium (Hf), tantalum (Ta), tungsten (W), mercury (Hg), thallium (Tl), lead (Pb), bismuth (Bi), lithium (Li), beryllium (Be), boron (B), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb) and lutetium (Lu).

Examples of the hydrolyzable metal alkoxide (A) are as follows:

tetraethoxysilane [$Si(OCH_2CH_3)_4$] (tetrafunctional)
methyltriethoxysilane [$CH_3Si(OCH_2CH_3)_3$] (trifunctional)
dimethyldiethoxysilane [$(CH_3)_2Si(OCH_2CH_3)_2$] (difunctional)
trimethylethoxysilane [$(CH_3)_3SiOCH_2CH_3$] (monofunctional) ethoxysiloxane oligomer
[$(CH_3CH_2O)_3Si-\{O-Si(OCH_2CH_3)_2\}_n-(OCH_2CH_3)$]
(n=1 to 4)(functionality of 6 to 12).

In addition, examples include
isocyanatopropyltriethoxysilane [$OCNC_3H_6Si(OCH_2CH_3)_3$]
glycidylpropyltriethoxysilane [$CH_2OCHC_3H_6Si(OCH_2CH_3)_3$]
aminopropyltriethoxysilane [$NH_3C_3H_6Si(OCH_2CH_3)_3$]
[$NH_2C_3H_6Si(OCH_2CH_3)_3$]
compounds of formulas:

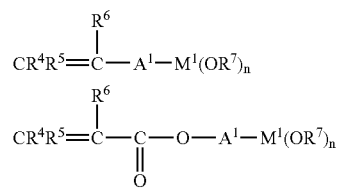

wherein $R^4$, $R^5$, $R^6$ and $R^7$ are, the same or different, a hydrogen atom or an alkyl group having 1 to 4 carbon atoms, $A^1$ is a direct bond or a divalent organic group,
$M^1$ is a metal such as Si, Ti, Al, Zn, Sn and Fe, and
n is from 1 to 3.

Specific examples thereof are as follows:
$CH_2$=$CHSi(OCH_3)_3$ (vinyltrimethoxysilane)
$CH_2$=$CHSi(OCH_2CH_3)_3$ (vinyltriethoxysilane)

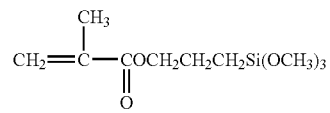

(3-methacryloxypropyltrimethoxysilane)

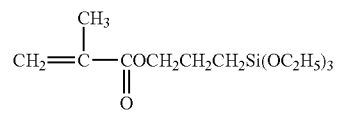

(3-methacryloxypropyltriethoxysilane)

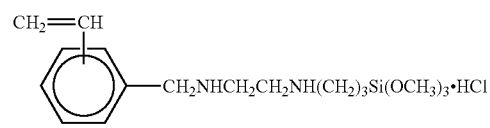

(N-[2-(vinylbenzylamino)ethyl]-3-aminopropyltrimethoxysilane hydrochloride)

Specific examples of the alkoxy titanium group-containing monomer include the following:

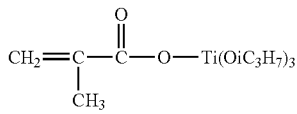

(titanium methacrylate triisopropoxide)

<Perfluoro Group-Containing Fluorocompound (B)>

The surface treatment agent of the present invention may contain the following perfluoro group-containing fluorocompound (B) having the functional group reacting with the hydrolyzable metal alkoxide (A). The fluorocompound (B) may be, for example, a compound of the general formula (2):

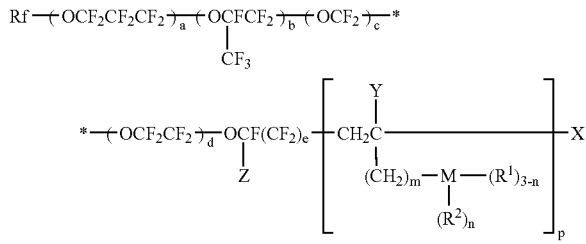

wherein Rf is a linear or branched perfluoroalkyl group having 1 to 16 carbon atoms,
X is an iodine atom or hydrogen atom,
Y is a hydrogen atom or a lower alkyl group,
Z is a fluorine atom or a trifluoromethyl group,
$R^1$ is a hydrolyzable group, or a chlorine atom,
$R^2$ is a hydrogen atom or a inert monovalent group,
a, b, c and d are an integer of from 0 to 200,
e is 0 or 1,
m and n is from 0 to 2,
p is an integer of from 1 to 10,
M is a metal, or a reactive group selected from the group consisting of an isocyanate group, a carboxyl group, a hydroxyl group, a glycidyl group, a phosphate group, an amino group and a sulfonate group.

Among them, the Rf group in the general formula (2) is usually a linear or branched perfluoroalkyl group having 1 to 16 carbon atoms, preferably, a $CF_3$ group, a $C_2F_5$ group or a $C_3F_7$ group. The lower alkyl group in Y is usually one having 1 to 5 carbon atoms. The hydrolyzable $R^1$ group is preferably a halogen atom such as a chlorine atom, a bromine atom and a iodine atom, a $R^3O$ group, a $R^3COO$ group, a $(R^4)_2C=C(R^3)CO$ group, a $(R^3)_2C=NO$ group, a $R^5C=NO$ group, a $(R^4)_2N$ group, and a $R^3CONR^4$ group (wherein $R^3$ is an aliphatic hydrocarbon group usually having 1 to 10 carbon atoms such as an alkyl group or an aromatic hydrocarbon group usually having 6 to 20 carbon atoms such as a phenyl group, $R^4$ is a hydrogen atom or a lower aliphatic hydrocarbon group usually having 1 to 5 carbon atoms such as an alkyl group, $R^5$ is a divalent aliphatic hydrocarbon group usually having 3 to 6 carbon atoms such as an alkylidene group.).

$R^1$ is more preferably a chlorine atom, a $CH_3O$ group, a $C_2H_5O$ group. $R_2$ is a hydrogen atom or a inert monovalent organic group, preferably a monovalent hydrocarbon group usually having 1 to 4 carbon atoms such as an alkyl group.

a, b, c and d are an integer of from 0 to 200, preferably an integer of from 1 to 50. m and n are an integer of from 0 to 2, preferably 0. p is 1 or an integer of at least 2, preferably an integer of from 1 to 10, more preferably an integer of from 1 to 5. The fluorocompound (B) preferably has a number-average molecular weight of from $5\times10^2$ to $1\times10^5$, more preferably from $1\times10^3$ to $1\times10^4$.

Examples of the silane compound of the general formula (2) include the following:

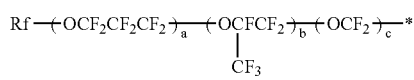

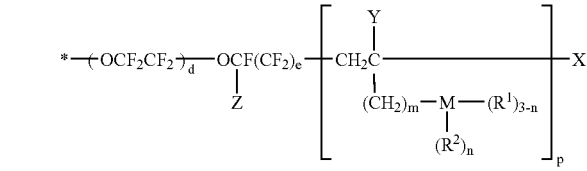

The preferable structure of the silane compound includes a compound wherein Rf is a $C_3F_7$ group, a is an integer from 1 to 50, b, c and d are 0, e is 1, Z is a fluorine atom, n is 0, that is, a compound of the following formula:

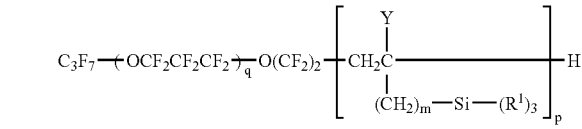

wherein Y, m, $R^1$ and p are the same as above, and q is an integer of from 1 to 50.

Examples of the perfluoro group-containing fluorocompound (B) are as follows:
2-perfluorooctylethyltriethoxysilane [$CF_3CF_2(CF_2CF_2)_3$ $CH_2CH_2$—$Si(OCH_2CH_3)_3$],
2-perfluorodecylethyltriethoxysilane [$CF_3CF_2(CF_2CF_2)_4$ $CH_2CH_2$—$Si(OCH_2CH_3)_3$],
2-perfluorododecylethyltriethoxysilane [$CF_3CF_2(CF_2CF_2)_5$ $CH_2CH_2$—$Si(OCH_2CH_3)_3$],
2-perfluorotetradecylethyltriethoxysilane [$CF_3CF_2(CF_2 CF_2)_6CH_2CH_2$—$Si(OCH_2CH_3)_3$],
2-perfluorooctylethanol [$CF_3CF_2(CF_2CF_2)_3CH_2CH_2OH$],
2-perfluorodecylethanol [$CF_3CF_2(CF_2CF_2)_4CH_2CH_2OH$],
2-perfluorododecylethanol [$CF_3CF_2(CF_2CF_2)_5CH_2CH_2 OH$],
2-perfluorotetradecylethanol [$CF_3CF_2(CF_2CF_2)_6CH_2CH_2 OH$],
2-perfluorooctylethyltrichlorosilane [$CF_3CF_2(CF_2CF_2)_3 CH_2CH_2$—$SiCl_3$],
2-perfluorodecylethyltrichlorosilane [$CF_3CF_2(CF_2CF_2)_4 CH_2CH_2$—$SiCl_3$],
2-perfluorododecylethyltrichlorosilane [$CF_3CF_2(CF_2CF_2)_5 CH_2CH_2$—$SiCl_3$],
2-perfluorotetradecylethyltrichlorosilane [$CF_3CF_2(CF_2 CF_2)_6CH_2CH_2$—$SiCl_3$],
3-perfluorooctyl-1,2-epoxypropane [$CF_3CF_2(CF_2CF_2)_3$-Gly],
3-perfluorodecyl-1,2-epoxypropane [$CF_3CF_2(CF_2CF_2)_4$-Gly],
3-perfluorododecyl-1,2-epoxypropane [$CF_3CF_2(CF_2CF_2)_5$-Gly], 3-perfluorotetradecyl-1,2-epoxypropane [CF$_3$CF$_2$(CF$_2$CF$_2$)$_6$-Gly],
(Gly is a glycidyl group.)

2-perfluorooctylethyl phosphate [CF$_3$CF$_2$(CF$_2$CF$_2$)$_3$—CH$_2$CH$_2$O$\}_m$—PO—(OH)$_{3-m}$], 2-perfluorodecylethyl phosphate [CF$_3$CF$_2$(CF$_2$CF$_2$)$_4$—CH$_2$CH$_2$O$\}_m$—PO—(OH)$_{3-m}$], 2-perfluorododecylethyl phosphate [CF$_3$CF$_2$(CF$_2$CF$_2$)$_5$—CH$_2$CH$_2$O$\}_m$—PO—(OH)$_{3-m}$], 2-perfluorotetradecylethyl phosphate [CF$_3$CF$_2$(CF$_2$CF$_2$)$_6$—CH$_2$CH$_2$O$\}_m$—PO—(OH)$_{3-m}$], (m=1 to 3)

The amount of the perfluoro group-containing fluorocompound (B) may be from 0.1 to 300 parts by weight, for example, from 50 to 200 parts by weight, based on 100 parts by weight of the hydrolyzable metal alkoxide (A).

<Adhesion Improvement Agent (C)>

The adhesion improvement agent in the present invention preferably has a surface free energy ($\gamma_s$) of at least 10 mJ/m$^2$, for example, at least 15 mJ/m$^2$, particularly at least 20 mJ/m$^2$. Examples of the adhesion improvement agent (C) include polymethacrylic acid (PMAA) (molecular weight: 55,000); $\gamma_s$=71.0 mJ/m$^2$, a methyl methacrylate/methacryloxypropyltrimethoxysilane copolymer (P(MMA-TMSM)= 9/1 molar ratio) (molecular weight: 100,000); $\gamma_s$=37.6 mJ/m$^2$. Preferably, the adhesion improvement agent (C) is a fluorine-free olefin polymer having a number-average molecular weight of at least 500, for example, at least 1,000. The fluorine-free olefin polymer can be obtained by reacting (a) a monomer having a carbon-carbon double bond and a metal alkoxide group (hereinafter referred to as "component (a)") with (b) other monomer copolymerizable with the component (a) (hereinafter referred to as "component (b)"). The fluorine-free polymer may be a homopolymer of the monomer (a), a homopolymer of the monomer (b), or a copolymer between the monomers (a) and (b). The fluorine-free olefin polymer may be a mixture of the polymer of the monomer (a) and the polymer of the monomer (b).

The component (a) may be a compound of the general formula:

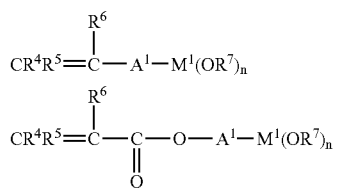

wherein R$^4$, R$^5$, R$^6$ and R$^7$ are, the same or different, a hydrogen atom or an alkyl group having 1 to 4 carbon atoms,
A$^1$ is a direct bond or a divalent organic group,
M$^1$ is a metal such as Si, Ti, Al, Zn, Sn and Fe, and
n is from 1 to 3.

Specific examples of the component (a) include an alkoxysilyl group-containing monomer and an alkoxy titanium group-containing monomer.

Examples of the alkoxysilyl group-containing monomer include, for example, the following:

CH$_2$=CHSi(OCH$_3$)$_3$ (vinyltrimethoxysilane)
CH$_2$=CHSi(OCH$_2$CH$_3$)$_3$ (vinyltriethoxysilane)

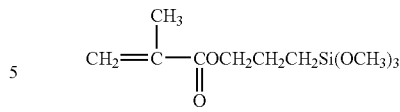

(3-methacryloxypropyltrimethoxysilane)

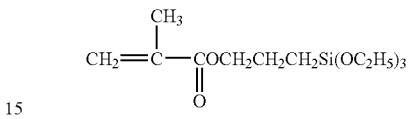

(3-methacryloxypropyltriethoxysilane)

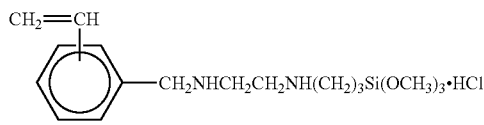

(N-[2-(vinylbenzylamino)ethyl]-3-aminopropyltrimethoxysilane dihydrochloride).

Specific examples of the component (b) copolymerizable with the component (a) include the following:

(1) alkyl vinyl ethers or cycloalkyl vinyl ethers such as methyl vinyl ether, ethyl vinyl ether, n-propyl vinyl ether, isopropyl vinyl ether, n-butyl vinyl ether, isobutyl vinyl ether, tert-butyl vinyl ether, n-pentyl vinyl ether, n-hexyl vinyl ether, n-octyl vinyl ether, n-dodecyl vinyl ether, lauryl vinyl ether, cetyl vinyl ether, 2-ethyl hexyl vinyl ether, ethyleneglycolbutyl vinyl ether, diethyleneglycol monovinyl ether, triethyleneglycol methyl vinyl ether and cyclohexyl vinyl ether;

(2) vinyl esters of carboxylic acid such as vinyl acetate, vinyl propionate, vinyl butyrate, vinyl pivalate, vinyl caproate, vinyl versatate, vinyl stearate and vinyl benzoate;

(3) α-olefins such as ethylene, propylene and isobutene, (4) vinyl aromatic compounds such as styrene, α-methylstyrene, o-methylstyrene, m-methylstyrene, p-methylstyrene, p-tert-butylstyrene, diisopropenylbenzene, o-chlorostyrene, m-chlorostyrene, p-chlorostyrene, 1,1-diphenylethylene, p-methoxystyrene, N,N-dimethyl-p-aminostyrene, N,N-diethyl-p-aminostyrene, vinylpyrizine and vinylimidazole;

(5) carboxyl group-containing compounds such as (meth)acrylic acid, crotonic acid, maleic acid, fumaric acid and itaconic acid;

(6) alkyl(meth)acrylates such as methyl(meth)acrylate, ethyl (meth)acrylate, propyl(meth)acrylate, isopropyl(meth)acrylate, butyl(meth) acrylate, isobutyl(meth)acrylate, tert-butyl(meth)acrylate, pentyl(meth)acrylate, amyl (meth)acrylate, isoamyl(meth)acrylate, hexyl(meth)acrylate, heptyl(meth)acrylate, octyl(meth)acrylate, isooctyl (meth)acrylate, 2-ethylhexyl(meth)acrylate, nonyl(meth) acrylate, decyl(meth)acrylate, isodecyl(meth)acrylate, undecyl(meth)acrylate, dodecyl(meth)acrylate, lauryl (meth)acrylate, stearyl(meth)acrylate and isostearyl (meth)acrylate;

(7) hydroxyalkyl(meth)acrylates such as hydroxyethyl (meth)acrylate, hydroxypropyl(meth)acrylate and hydroxybutyl(meth)acrylate;

(8) phenoxyalkyl(meth)acrylates such as phenoxyethyl (meth)acrylate and 2-hydroxy-3-phenoxypropyl(meth) acrylate;

(9) alkoxyalkyl(meth)acrylates such as methoxyethyl(meth) acrylate, ethoxyethyl(meth)acrylate, propoxyethyl(meth) acrylate, butoxyethyl(meth)acrylate and methoxybutyl (meth)acrylate;

(10) polyethyleneglycol(meth)acrylates such as polyethyleneglycol mono(meth)acrylate, ethoxydiethylene-glycol (meth)acrylate, methoxypolyethyleneglycol(meth)acrylate, phenoxypolyethyleneglycol(meth)acrylate and nonylphenoxypolyethyleneglycol(meth)acrylate;

(11) polypropyleneglycol(meth)acrylates such as polypropyleneglycol mono(meth)acrylate, methoxy-polypropyleneglycol(meth)acrylate, ethoxypolypropylene-glycol (meth)acrylate and nonylphenoxypolypropyleneglycol (meth)acrylate;

(12) cycloalkyl(meth)acrylates such as cyclohexyl(meth) acrylate, 4-butylcyclohexyl(meth)acrylate, dicyclopentanyl(meth)acrylate, dicyclopentenyl(meth)acrylate, dicyclopentadienyl(meth)acrylate, bornyl(meth)acrylate, isobornyl(meth)acrylate and tricyclodecanyl(meth)acrylate;

(13) (meth)acrylamides such as acryloyl morpholine, diacetone(meth)acrylamide, isobutoxymethyl(meth)acrylamide, dimethylaminoethyl(meth)acrylamide, diethylaminoethyl-(meth)acrylamide, dimethylaminopropyl(meth) acrylamide, tert-octyl(meth)acrylamide, 7-amino-3,7-dimethyloctyl-(meth)acrylamide, N,N-dimethyl(meth) acrylamide and N,N-diethyl(meth)acrylamide;

(14) unsaturated carboxylate esters such as methyl crotonate, ethyl crotonate, propyl crotonate, butyl crotonate, methyl cinnamate, ethyl cinnamate, propyl cinnamate, butyl cinnamate, dimethyl itaconate, diethyl itaconate, dimethyl maleate, diethyl maleate, dimethyl fumarate and diethyl fumarate;

(15) unsaturated nitriles such as (meth)acrylonitrile, α-chloroacrylonitrile, α-chloromethylacrylonitrile, α-methoxyacrylonitrile, α-ethoxyacrylonitrile, crotonic acid nitrile, cinnamic acid nitrile, itaconic acid dinitrile, maleic acid dinitrile and fumaric acid dinitrile;

(16) hydroxy group-containing vinyl ethers such as 2-hydroxyethyl vinyl ether, 2-hydroxypropyl vinyl ether, 3-hydroxypropyl vinyl ether, 3-hydroxybutyl vinyl ether, 4-hydroxybutyl vinyl ether, 5-hydroxypentyl vinyl ether and 6-hydroxyhexyl vinyl ether;

(17) hydroxy group-containing allyl ethers such as 2-hydroxyethyl allyl ether, 4-hydroxybutyl allyl ether and glycerol monoallyl ether;

(18) N-vinyl lactams such as N-vinyl-2-pyrrolidone and N-vinyl-2-caprolactam;

(19) soluble polyamide copolymers such as polyamides 6, 66, 610 and 12 copolymers.

Among the above monomeric compounds, preferably used are alkyl vinyl ethers, cycloalkyl vinyl ethers, vinyl carboxylate esters, methyl(meth)acrylate, ethyl(meth)acrylate, propyl(meth)acrylate, isopropyl(meth)acrylate, which may be used alone or in combination.

The fluorine-free olefin polymer having the number-average molecular weight of at least 500 may be a polybranched compound which is three-dimensionally branched, for example, so called "dendrimer" having hyper-branched structure having regularity. It may be a vinyl group-containing dendrimer comprising a core portion, a split portion, a branch portion and a terminal portion wherein the terminal portion comprises a vinyl group and an active hydrogen-containing functional group other than the vinyl group, the dendrimer being obtained by reacting the polyfunctional compound (a) having at least 4 terminal functional groups, and at least 5 active hydrogen atoms derived from terminal functional groups, with the vinyl group-containing compound having at least one functional group capable of reacting with the active hydrogen atom so that the vinyl group is introduced in the amount of at most 95% of all active hydrogen atoms into at least one active hydrogen group derived from terminal functional group possessed by the polyfunctional compound (a).

It may be, for example, the above vinyl group-containing dendrimer wherein the polyfunctional compound (a) is a polyamino dendrimer of the following formula (i) or (ii). Examples of the polyamino dendrimer having terminal amino group include:

a propyleneimine dendrimer of the formulas (i) and (ii) obtained by conducting a step of reacting butylene diamine with acrylonitrile to reduce the terminal nitrile group into amine and repeating this step (WO093/14147, U.S. Pat. No. 5,530,092, and JP-B-7-330631);

an amideamine dendrimer of the following formula (iv) obtained by conducting a step of reacting methyl acrylate to ammonia or ethylene diamine by Michael addition and subjecting the reactants to an ester-amide exchange reaction to introduce a secondary amino group at the terminal, and optionally repeating this step (WO84/02705, and JP-B-6-70132) and intermediate thereof; and compounds having the structures of the formulas (iii) and (v).

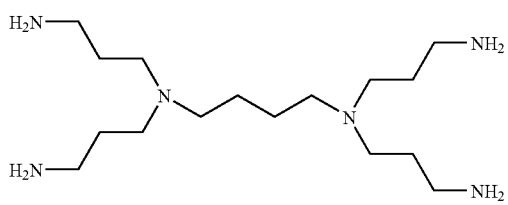

(i)

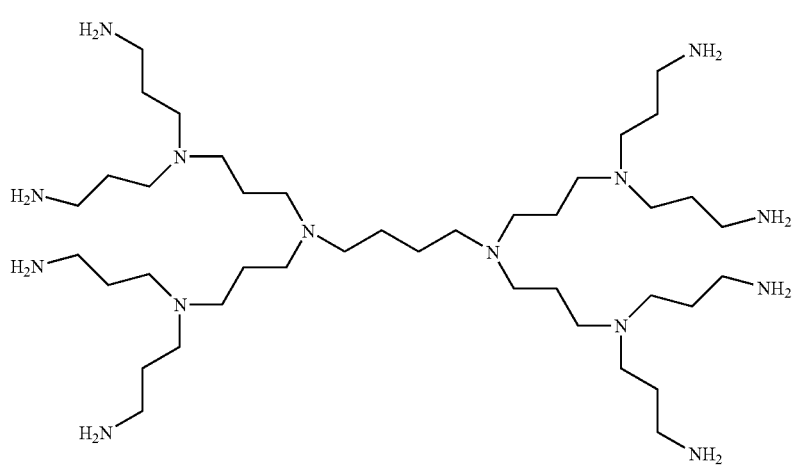
(ii)
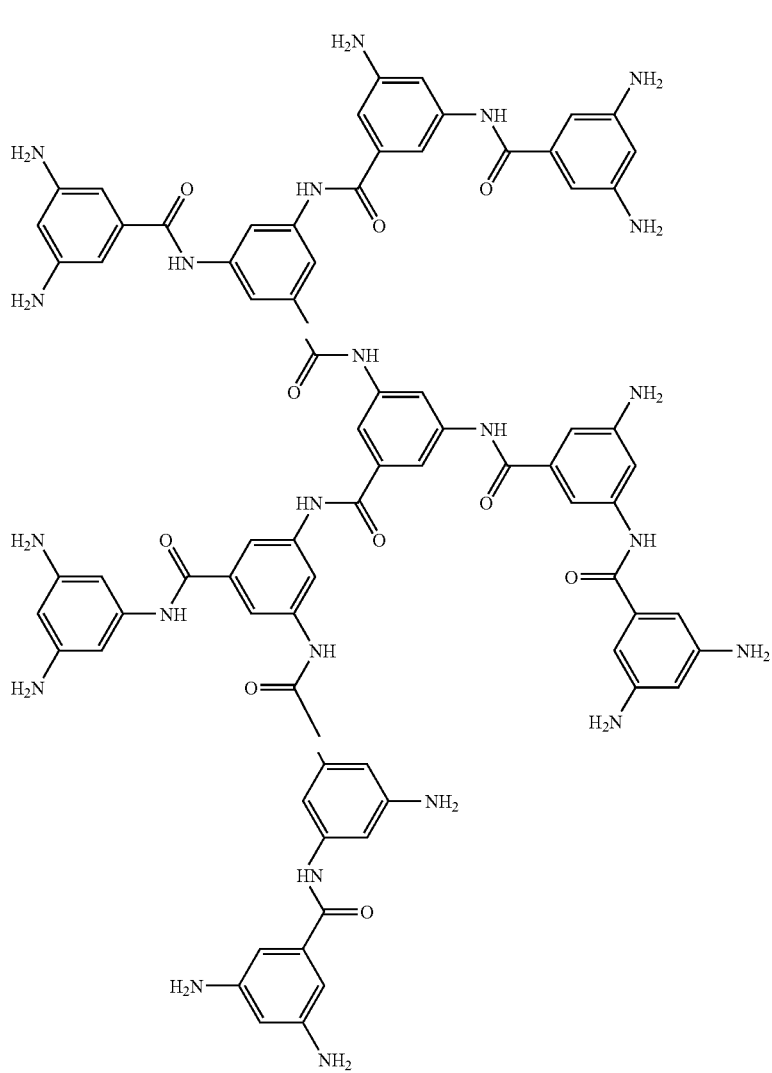
(iii)

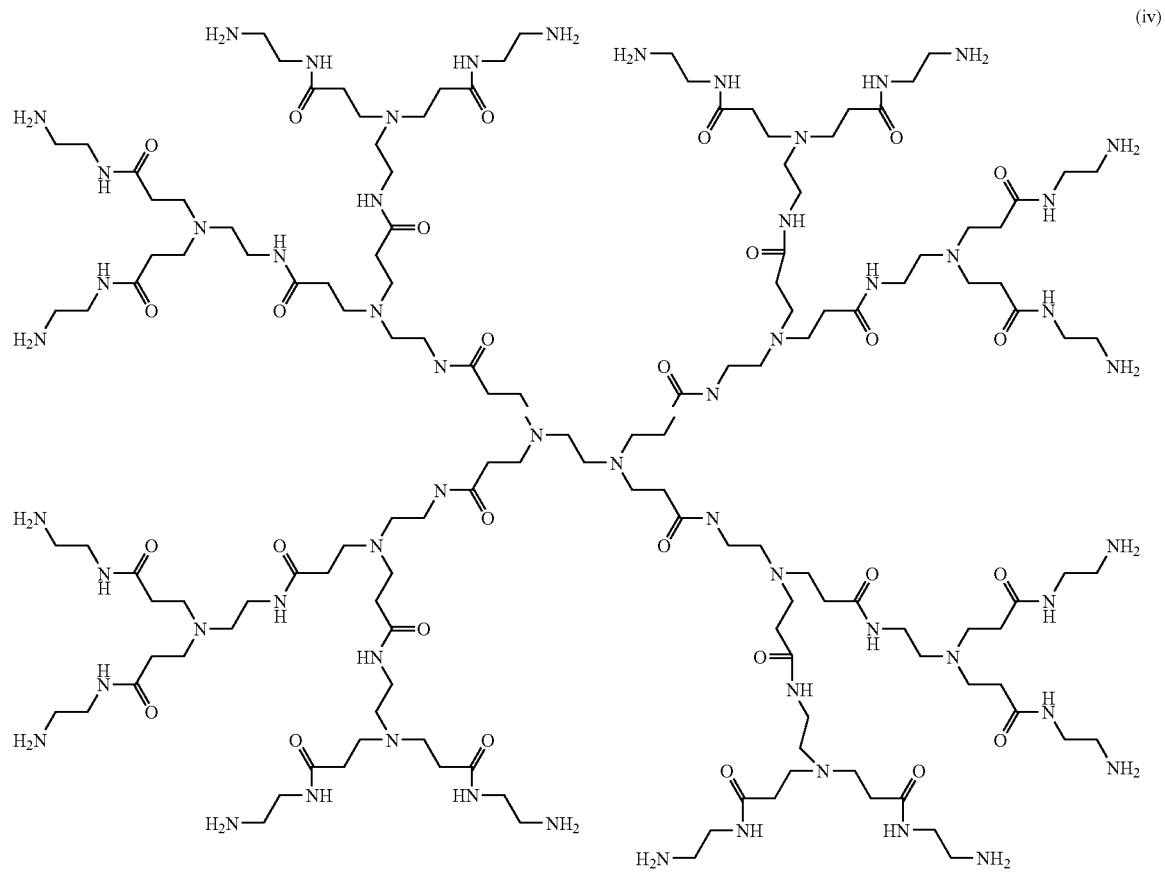
(iv)
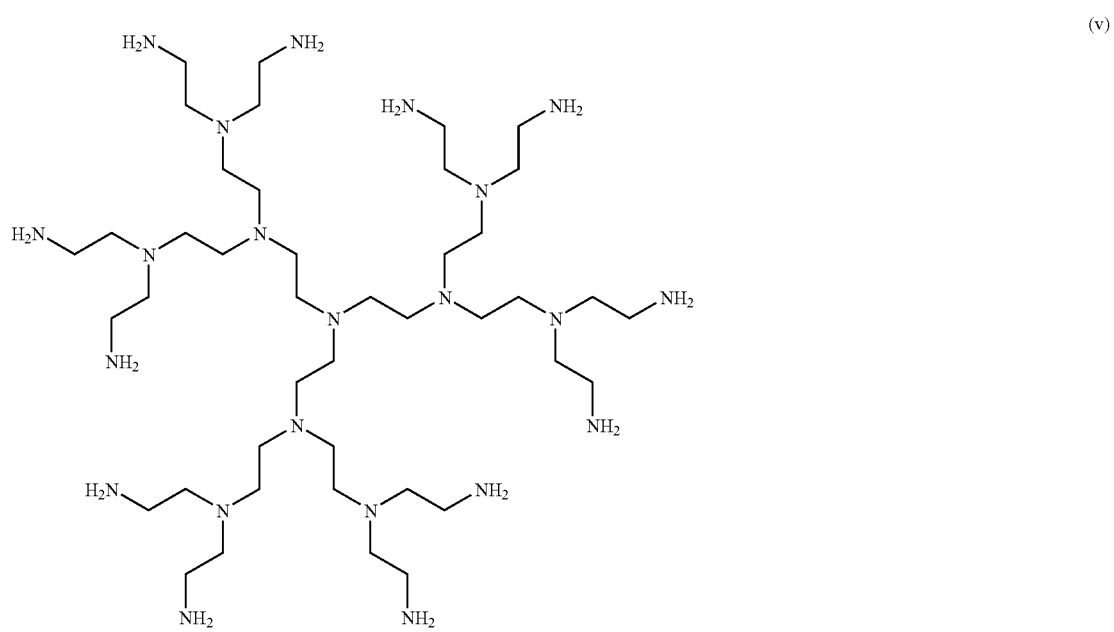
(v)

The amount of the component (C) is from 0.1 to 500 parts by weight, for example, from 1 to 50 parts by weight, based on 100 parts by weight of the hydrolyzable metal alkoxide (A).

<Polymer Having the Number-Average Molecular Weight of at Least 500 and Containing the Polysiloxane Segment>

Specific examples of the polymer containing the polysiloxane segment in the present invention include the following.

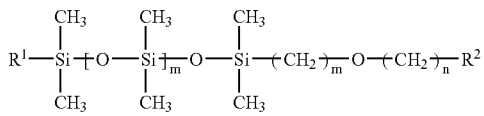

wherein $R^1$ is an alkyl group having at least one carbon atom, $R^2$ is a glycidyl group, a hydroxyl group, an isocyanate group, an alkoxy group or a carboxyl group, m is an integer of at least 1, and n is an integer of from 0 to 10.

Specific examples thereof include one wherein $R^2$ is a hydroxyl group, that is, tradenames: FM-0411 (MW=about 1,000), FM-0421 (MW=about 5,000) and FM-0425 (MW=about 10,000) manufactured by Chisso Corporation, and one wherein $R^2$ is a glycidyl group, that is, tradenames: FM-0511 (MW=about 1,000), FM-0513 (MW=about 2,000), FM-0515 (MW=about 2,500) and FM-0521 (MW=about 4,000) manufactured by Chisso Corporation.

<The Fluoropolymer (D) Having the Number-Average Molecular Weight of at Least 500>

The surface treatment agent preferably contains the fluoropolymer (D) having the number-average molecular weight of at least 500 represented by the following general formula (3), which reacts with the hydrolyzable metal alkoxides (A) to (C). The fluoropolymer (D) is preferably of, for example, general formula (3):

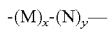

wherein x and y is, for example, from 1 to 500.

In the formula, the structural unit M is a structural unit derived from a fluorine-containing ethylenic monomer of the formula (M):

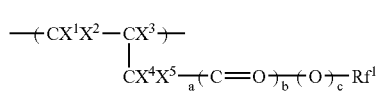

wherein $X^1$ and $X^2$ are, the same or different, H or F, (in which, $X^1$ and $X^2$ are, the same or different, H or F, $X^3$ is H, F, $CH_3$ or $CF_3$, $X^4$ and $X^5$ are, the same or different, H, F or $CH_3$, $Rf^1$ is an organic group wherein 1 to 3 $y^3$ groups ($y^3$ is a hydroxyl group, a glycidyl group, an amino group, an alkoxy group, a carboxyl group, an isocyanate group, or $C_1$–$C_{10}$ monovalent organic group having at least one of these reactive groups) are bonded to a $C_1$–$C_{40}$ fluorine-containing alkyl group or a $C_2$–$C_{100}$ fluorine-containing alkyl group having an ether linkage, a is an integer of from 0 to 3, b and c are, the same or different, 0 or 1.

On the other hand, the structural unit N is a structural unit obtained by reacting (for example, esterifying) an unsaturated carboxylic acid of the formula (A) or a derivative thereof:

(in which $R^1$ is a divalent organic group having 1 to 7 carbon atoms, which may be substituted with a fluorine atom, $X^6$ is H, F, $CH_3$ or $CF_3$, $X^7$ and $X^8$ are, the same or different, H or F, f is 0 or 1), with the $y^3$ group in the $Rf^1$ group of the ethylenic monomer giving the structural unit M.

The carbon number of the unsaturated carboxylic acid or derivative thereof is preferably from 3 to 10. Total carbon number of $y^3$ in M and the unsaturated carboxylic acid or derivative thereof is preferably from 3 to 10.

The amount of the component (D) is from 0.1 to 300 parts by weight, for example, from 10 to 200 parts by weight, based on 100 parts by weight of the hydrolyzable metal alkoxide (A).

The fluoropolymer (D) may be a fluoropolymer which contains 0.1 to 99.9% by mol of the structural unit M and 0.1 to 99.9% by mol of structural unit N, and which has a number-average molecular weight of 500 to 1,000,000.

In the formula, the unsaturated carboxylic acid or derivative thereof which is reacted with the fluoropolymer containing the reactive group such as the hydroxyl group possessed by the structural unit M is the carboxylic acid having carbon-carbon double bond at the molecular end and derivative thereof, and is preferably an α,β-unsaturated carboxylic acid and derivative thereof.

Examples thereof are, for example, a carboxylic acid of the formula:

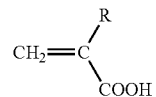

wherein R is H, $CH_3$, F, $CF_3$ or Cl, or an anhydride thereof, and an acid halide of the formula:

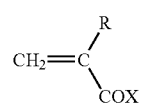

wherein R is the same as the above, and X is Cl or F, as well as maleic acid, maleic anhydride and monoalkyl ester of maleic acid.

Among them, the adoption of the unsaturated carboxylic halide is preferably, since the reaction can be conducted under room temperature and gelation of the resultant polymer can be prevented.

Specific examples of particularly preferable one include:

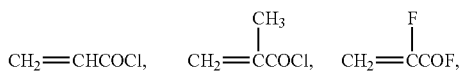

and the like.

A method of reacting the α,β-unsaturated carboxylic halide with the fluoropolymer containing the reactive group such as the hydroxyl group possessed by the structural unit M is not limited. Usually, the hydroxyl group-containing fluoropolymer is dissolved in a solvent, the α,β-unsaturated carboxylic halide is added with stirring at a temperature of about −20° C. to 40° C. and then the reaction is conducted.

The reaction produces HCl and HF by-products, and it is desirable to add a suitable base for the purpose of trapping the by-products. Examples of the base include a tertiary amine such as pyridine, N,N-dimethylaniline, tetramethylurea and triethylamine, and metallic magnesium. An inhibitor may be added for the purpose of inhibiting the polymerization reaction of the α,β-unsaturated carboxylic halide and the carbon-carbon double bond in the resultant curable fluoropolymer.

Examples of the inhibitor includes hydroquinone, t-butylhydroquinone and hydroquinone monomethyl ether.

The fluoropolymer containing the reactive group such as hydroxyl group before reacting with the unsaturated carboxylic acid or derivative thereof can be obtained by (co)polymerizing the ethylenic monomer (M) containing the reactive group such as the hydroxyl group optionally with comonomer (N) in a conventional procedure, wherein each of these monomers corresponds each of structural units. A radical polymerization, an anion polymerization, a cation polymerization and the like can be used as the polymerization procedure. Among them, the radical polymerization is preferable, because the monomers exemplified for the purpose of obtaining the hydroxyl group-containing polymer of the present invention have good radical polymerizability, a quality such as a composition and a molecular weight can be easily controlled, and the radical polymerization can be easily commercialized.

The initiation of the radical polymerization is not limited, insofar as a means of radically proceeding the polymerization is used. The radical polymerization can be initiated by, for example, an organic or inorganic radical initiating agent, heat, light or ionizing radiation. The polymerization may be in solution polymerization, bulk polymerization, suspension polymerization, emulsion polymerization and the like. The molecular weight can be controlled by a monomer concentration, a polymerization initiating agent concentration, a chain transfer agent concentration, a temperature used in the polymerization and the like. A composition of the copolymer can be controlled by a composition of monomers charged.

The surface treatment agent of the present invention may comprise the above-mentioned separate components (A) to (C) (and optionally the component (D)) before the reaction, or may comprise the polymer of components (A) to (C) (and optionally the component (D)) after the reaction.

The surface treatment agent of the present invention may be a surface treatment agent which comprises:
(1) a polymer of the component (A) to (C) and optionally the component (D), or
  (A) the hydrolyzable metal alkoxide or the hydrolyzate thereof,
  (B) the perfluoroalkyl group-containing fluorocompound having the functional group reacting with the hydrolyzable metal alkoxide (A),
  (C) the adhesion improvement agent, preferably a polymer containing a polysiloxane segment having a number-average molecular weight of at least 500, for example, at least 1,000 in a side chain of the adhesion improvement agent,
  (D) optionally present, the fluoropolymer having the number-average molecular weight of at least 500,
(2) an active energy ray cure initiator, and
(3) a solvent.

The active energy ray cure initiator (2) can evolve a radical, a cation and the like, and can act as a catalyst for curing (cross-linking) the hydrolyzable metal alkoxide (A) and the carbon-carbon double bond of the fluoropolymer (D), after radiating electromagnetic wave having a wavelength range of at most 350 nm, that is, ultraviolet light, electron beam, X-ray, γ-ray and the like. The cure initiator (2) can usually evolve the cation and radical, particularly radical, by UV light The surface treatment agent can easily initiate the curing reaction by the active energy ray, does not need the heating at high temperature, and can conduct the curing reaction at a relatively low temperature. The surface treatment agent can be advantageously applied to a substrate having low heat resistance which can easily conduct the deformation, the decomposition and the discoloration by the heat, for example, a transparent resin substrate.

The active energy ray cure initiator (2) in the composition of the present invention is selected depending on, for example, the hydrolyzable metal alkoxide (A), the type (the radical reactivity or the cationic reactivity) of the carbon-carbon double bond in the fluoropolymer (D), the type (for example, wavelength range) and the radiation strength of the used active energy ray. Generally, examples of the initiating agent for curing the hydrolyzable metal alkoxide (A) and the fluoropolymer (D) having the radically reactive carbon-carbon double bond by means of the UV-range active energy ray are as follows:

Acetophenone Type
  acetophenone, chloroacetophenone, diethoxyacetophenone, hydroxyacetophenone, α-aminoacetophenone and the like Benzoin Type
  benzoin, benzoin methyl ether, benzoin ethyl ether, benzoin isopropyl ether, benzoin isobutyl ether, benzyldimethylketal and the like Benzophenone Type
  benzophenone, benzoylbenzoic acid, methyl benzoylbenzoate, 4-phenylbenzophenone, hydroxybenzophenone, hydroxypropyl-benzophenone, acrylated benzophenone, Michler's ketone and the like Thioxanthone Type
  thioxanthone, chlorothioxanthone, methylxanthone, diethylthioxanthone, dimethylthioxanthone and the like Others
  benzil, α-acyloxime ester, acyl phosphine oxide, glyoxy ester, 3-ketocoumarin, 2-ethylanthraquinone, camphor quinone, anthraquinone and the like.

A photo-initiation aid such as amines, sulfones and sulfines may be added, if necessary.

Examples of the initiating agent for curing the hydrolyzable metal alkoxide (A) and the fluoropolymer (D) having the cationically reactive carbon-carbon double bond are as follows:

Onium Salts iodonium salt, sulfonium salt, phosphonium salt, diazonium salt, ammonium salt, pyridinium salt and the like Sulfone Compounds β-ketoester, β-sulfonyl sulfone and α-diazo compound thereof and the like Sulfonate Esters alkyl sulfonate ester, haloalkyl sulfonate ester, aryl sulfonate ester, iminosulfonate and the like Others sulfone imide compounds, diazomethane compounds and the like.

A different embodiment of the surface treatment agent comprising inorganic and organic hybrid material according to the present invention is the use of a solvent. Advantageously, the surface treatment agent is dissolved or dispersed in the solvent, various substrates are coated to give a coating film which is then efficiently cured by means of radiation such as an active energy ray to give a cured coating film.

The solvent (3) is not specifically limited, insofar as the hydrolyzable metal alkoxide (A), the fluoropolymer (D), the active energy ray cure initiator (2) and optionally added additives such as a curing agent, a leveling agent and a photostable agent are homogeneously dissolved or dispersed in the solvent. The solvent (3) which homogeneously dissolves the hydrolyzable metal alkoxide (A) and the fluoropolymer (D) is particularly preferable. The embodiment comprising the solvent is preferable, since a highly transparent and homogeneous film can be formed in good productivity particularly in a field which requires a thin film (about 0.1 μm) as in an antireflective film application.

Examples of the solvent (3) include:

cellosolve solvents such as methyl cellosolve, ethyl cellosolve, methyl cellosolve acetate and ethyl cellosolve acetate;

ester solvents such as diethyl oxalate, ethyl pyruvate, ethyl 2-hydroxybutyrate, ethyl acetoacetate, butyl acetate, amyl acetate, ethyl butyrate, butyl butyrate, methyl lactate, ethyl lactate, methyl 3-methoxypropionate, ethyl 3-methoxypropionate, methyl 2-hydroxyisobutyrate and ethyl 2-hydroxyisobutyrate;

propylene glycol solvents such as propylene glycol monomethyl ether, propylene glycol monoethyl ether, propylene glycol monobutyl ether, propylene glycol monomethyl ether acetate, propylene glycol monoethyl ether acetate, propylene glycol monobutyl ether acetate and dipropylene glycol dimethyl ether;

ketone solvents such as 2-hexanone, cyclohexanone, methyl aminoketone and 2-heptanone;

alcohol solvents such as methanol, ethanol, propanol, isopropanol and butanol;

aromatic hydrocarbons such as toluene and xylene; and mixture solvents of at least two of these.

In order to increase the solubility of the perfluoroalkyl group-containing fluorocompound (B) and the fluoropolymer (D), a fluorine-containing solvent may be optionally used.

Examples of the fluorine-containing solvent include:

$CH_3CCl_2F$ (HCFC-141b), $CF_3CF_2CHCl_2/CClF_2CF_2CHClF$ mixture (HCFC-225), perfluorohexane, perfluoro(2-butyltetrahydrofuran), methoxynonafluorobutane, 1,3-bistrifluoromethylbenzene; and fluorine-containing alcohols such as $H(CF_2CF_2)_nCH_2OH$ (n: integer of 1 to 3), $F(CF_2)_nCH_2OH$ (n: integer of 1 to 5) and $(CF_3)_2CHOH$, benzotrifluoride, perfluorobenzene, perfluoro(tributyl-amine), and $ClCF_2CFClCF_2CFCl_2$.

The fluorine-containing solvent can be used alone or in combination of at least two fluorine-containing solvents or combination of at least one fluorine-containing solvent and at least one fluorine-free solvent.

Among them, the ketone solvents, the acetate ester solvents, the alcohol solvents, the aromatic solvents and the like are preferable in view of coatability and productivity of the coating film.

The curable fluorine-containing surface treatment agent comprising the above-mentioned polymer (1) containing the components (A) to (D) and the active energy ray cure initiator (2), and the coating surface treatment agent comprising the solvent (3) in addition to the components (1) and (2) may contains a curing agent (4), according to necessity.

The curing agent preferably one which has at least one carbon-carbon unsaturated bond and which can be polymerized by means of radical or acid. Examples of the curing agent include a radically polymerizable monomer such as an acrylic monomer, and a cationically polymerizable monomer such as a vinyl ether monomer. The monomer may be a monofunctional monomer having one carbon-carbon double bond or a polyfunctional monomer having at least two carbon-carbon double bonds.

The curing agent having the carbon-carbon double bond reacts in the form of a radical or cation generated from the reaction with the active energy ray cure initiator (2) contained in the composition of the present invention, and the curing agent can crosslink the polymer (1) comprising the components (A) to (D) contained in the composition of the present invention by means of the copolymerization between the carbon-carbon double bond of the side chains of the polymer (1) and the curing agent.

Examples of the monofunctional acrylic monomer which can be used as the curing agent include acrylic acid, acrylate esters, methacrylic acid, methacrylate esters, α-fluoroacrylic acid, α-fluoroacrylate esters, maleic acid, maleic anhydride, maleate esters; and (meth)acrylate esters having an epoxy group, a hydroxyl group, carboxyl group or the like.

Among them, the acrylate monomer having the fluoroalkyl group is preferable in view of low refractive index of the cured material. For example, a compound of the general formula:

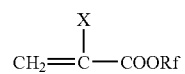

wherein X is H, $CH_3$ or F,

Rf is a fluoroalkyl group having 2 to 40 carbon atoms or a fluoroalkyl group having 2 to 100 carbon atoms and an ether linkage, is preferable.

Specific examples of the acrylate monomer having the fluoroalkyl group include:

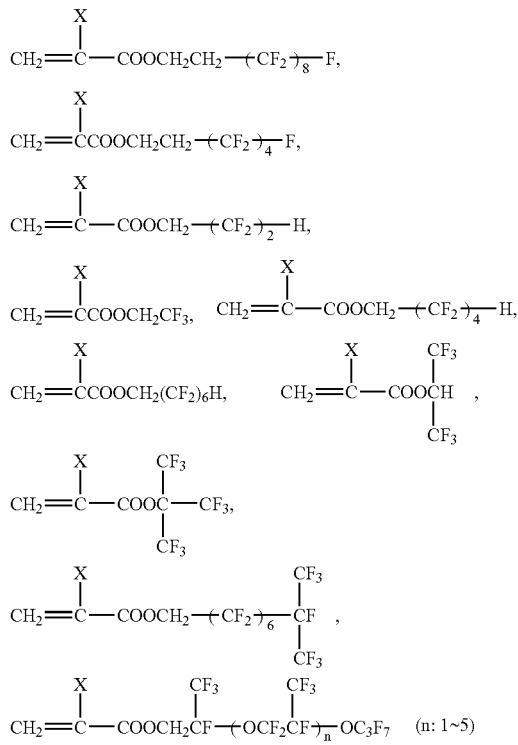

wherein X is a hydrogen atom, a methyl group or a fluorine atom.

As the polyfunctional acrylic monomer which can be used as the curing agent, generally known are compounds wherein a hydroxyl group in a polyhydric alcohol such as a diol, a triol and a tetraol is replaced with an acrylate group, a methacrylate group or an α-fluoroacrylate group. A crosslinking agent such as N,N-methylenebisacrylamide may be optionally contained.

Specific examples of the polyfunctional acrylic monomer include compounds wherein at least two hydroxyl groups of a polyhydric alcohol such as 1,3-butane diol, 1,4-butane diol, 1,6-hexane diol, diethyleneglycol, tripropyleneglycol, neopentylglycol, trimethylolpropane, pentaerythritol and dipetaerythritol are replaced with an acrylate group, a methacrylate group or an α-fluoroacrylate group.

A polyfunctional acrylic monomer wherein at least two hydroxyl groups of a polyhydric alcohol having a fluoroalkyl group or fluoroalkylene group are replaced with an acrylate group, a methacrylate group or an α-fluoroacrylate group can be used as the curing agent, which is particularly preferable in view of the low refractive index of the cured material.

Specific examples thereof include compounds having the structure wherein at least two hydroxyl groups of fluorine-containing polyhydric alcohols of the general formulas:

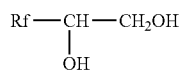

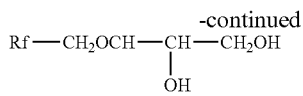

wherein Rf is a fluoroalkyl group having 1 to 40 carbon atoms,

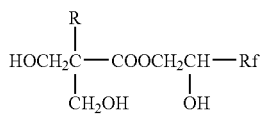

wherein Rf is a fluoroalkyl group having 1 to 40 carbon atoms, and

R is H or an alkyl group having 1 to 3 carbon atoms,

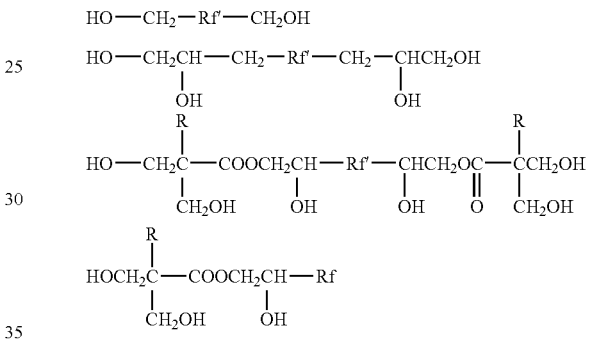

wherein Rf' is a fluoroalkylene group having 1 to 40 carbon atoms, and

R is H or an alkyl group having 1 to 3 carbon atoms, are replaced with an acrylate group, a methacrylate group or an α-fluoroacrylate group.

When the exemplified monofunctional and polyfunctional monomers are used as the curing agent in the composition of the present invention, particularly α-fluoroacrylate compounds are preferable in view of good curing reactivity.

In the present invention, the coating film may comprise:
(A-1) the hydrolyzable metal alkoxide or hydrolyzate thereof, and
(B-1) fluorine-containing organic compound.

The optical article having the coating film preferably has a continuous wavelength range of at least 100 nm exhibiting a reflectance of at least 3.5%, more preferably a continuous wavelength range of at least 100 nm exhibiting a reflectance of at least 3%. The reflectivity at a wavelength range of 400 to 800 nm is preferably at most 3%, particularly at most 2.5%. The surface treatment agent preferably comprises 5 to 70 mol %, based on the metal alkoxide, of the fluorine-containing compound.

Herein examples of the fluorine-containing organic compound (B-1) are as follows:
(1) the perfluoro group-containing fluorocompound (B) having the functional group reacting with the hydrolyzable metal alkoxide (A), as well as
(2) the fluoropolymer (D) having the number-average molecular weight of 500 alone, and (3) an acrylate monomer having a fluoroalkyl group, for example, an acrylate monomer as such, of the general formula:

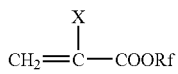

wherein X is H, CH$_3$ or F,

Rf is a fluoroalkyl group having 2 to 40 carbon atoms or a fluoroalkyl group having an ether linkage and 2 to 40 carbon atoms, a homopolymer of said acrylate monomer or a combination of said acrylate monomer and said fluoropolymer (D) (for example, a copolymer comprising the acrylate monomer and a monomer constituting the fluoropolymer (D)).

Specific examples of the fluoroalkyl group-containing acrylate monomer include:

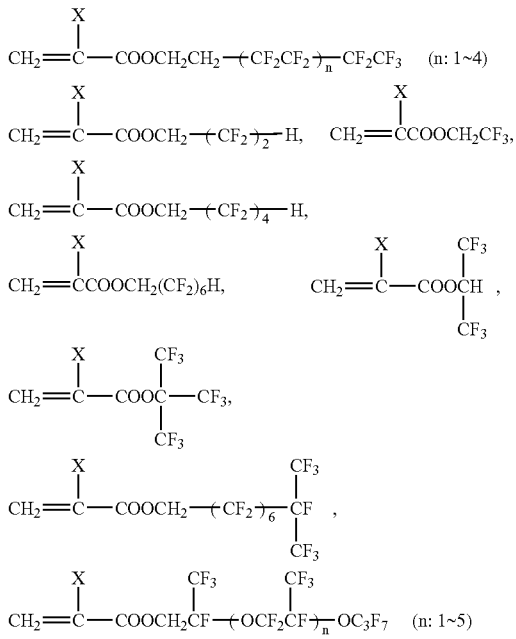

wherein X is a hydrogen atom, a methyl group or a fluorine atom.

In the composition of the present invention, the amount of the active energy ray cure initiator (2) is suitably selected depending on the content amount of the carbon-carbon double bond in the polymer (1) comprising the components (A) to (D), the presence or absence of the curing agent, the use amount of the curing agent, types of the initiating agent and the active energy ray, and the radiation energy amount (strength and time of radiation). When the curing agent is not used, the amount of the active energy ray cure initiator (2) is preferably from 0.01 to 30 parts by weight, more preferably from 0.05 to 20 parts by weight, most preferably 0.1 to 10 parts by weight, based on 100 parts by weight of the polymer (1) comprising the components (A) to (D).

Particularly, the amount is from 0.05 to 50% by mol, more preferably form 0.1 to 20% by mol, most preferably from 0.5 to 10% by mol, based on the content (molar amount) of the carbon-carbon double bond contained in the polymer (1) comprising the components (A) to (D)

When the curing agent is used, the amount is from 0.05 to 50% by mol, more preferably form 0.1 to 20% by mol, most preferably from 0.5 to 10% by mol, based on total molar number of the content (molar amount) of the carbon-carbon double bond contained in the polymer (1) comprising the components (A) to (D) and molar number of the carbon-carbon unsaturated bond contained in the curing agent.

The amount of the solvent (3) in the coating fluororesin composition of the present invention is suitably selected depending on the type of the solid to be dissolved, the presence or absence and amount of the curing agent, the type of the substrate to be coated, and target film thickness. The amount of the solvent is preferably so that total solid concentration of the surface treatment agent is from 0.5 to 70% by weight, more preferably from 1 to 50% by weight.

The surface treatment agent of the present invention may contain various additives depending on the necessity in addition to the above-mentioned compounds.

Examples of the additives include a leveling agent, a viscosity control agent, a photostable agent, a moisture absorption agent, a pigment, a dye and a reinforcing agent.

The surface treatment agent of the present invention may contain fine particles of inorganic compound for the purpose of increasing the hardness of the cured material.

The fine particles of inorganic compound are not limited and preferably have a refractive index of at most 1.5. Specific examples thereof are desirably fine particles of magnesium fluoride (refractive index: 1.38), silicon oxide (refractive index: 1.46), aluminum fluoride (refractive index: 1.33 to 1.39), calcium fluoride (refractive index: 1.44), lithium fluoride (refractive index: 1.36 to 1.37), sodium fluoride (refractive index: 1.32 to 1.34), thorium fluoride (refractive index: 1.45 to 1.50). Electrically conductive or semiconductive particles of CuS, CdS, Ag and the like are also desirable. The particle size is desirably sufficiently small in comparison with the wavelength of visible light, in order that the transparency of a low refractive index material is maintained. The particle size is preferably at most 100 nm, particularly at most 50 nm.

When using the fine particles of inorganic compound, they are desirably used in the form of an organic sol which previously disperses the fine particles into an organic dispersing medium for the purpose of not deteriorating the dispersion stability in the composition, the adhesion in the refractive index material and the like. In order that the dispersion stability in the composition, the adhesion in the refractive index material and the like are improved, the surfaces of the fine particles of inorganic compound can be previously modified by means of various coupling agents. Examples of the coupling agent include an organically substituted silicon compound; an alkoxide of a metal such as aluminum, titanium, zirconium, antimony and a mixture thereof; a salt of organic acid; a coordination compound bonded to a coordinative compound.

The surface treatment agent of the present invention may be one wherein the polymer (1) comprising the components (A) to (D), or the additives are dispersed or dissolved in the solvent (3). A homogeneous solution is preferable in view of the formation of a homogeneous thin film and the film formation at low temperature.

A conventional coating method can be adopted as the coating method, insofar as the film thickness can be controlled.

Examples of the coating method include a roll coating method, a gravure coating method, a microgravure coating method, a flow coating method, a bar coating method, a spray coating method, a die coating method, a spin coating method and a dip coating method. The coating method can be selected with considering the type and shape of the substrate, the productivity of film and the controllability of the film thickness.

The surface treatment agent comprising the polymer (1) comprising the components (A) to (D) and the active energy ray cure initiator (2), and the coating film obtained by coating the surface treatment agent of the present invention on the substrate by, for example, the above-mentioned method, and drying the surface treatment agent, can be photo-cured by irradiating an active energy ray such as ultraviolet light, electron beam and radiation.

When photo-cured, the carbon-carbon double bond in the polymer (1) comprising the components (A) to (D) polymerizes between the molecules so that the carbon-carbon double bonds in the polymer decreases or disappears. Thus, the coating film has the increased hardness, the improved mechanical strength, and the improved abrasion resistance and scratch resistance. In addition, the coating film becomes insoluble in a solvent which dissolves the uncured coating film and becomes insoluble in a large number of various other solvents.

Preferable film thickness of the surface treatment agent to be coated on various substrates is varied depending on the refractive index of the film and the refractive index of the substrate, and may be from 0.03 to 0.5 µm, preferably from 0.07 to 0.2 µm, more preferably from 0.08 to 0.12 µm. If the film thickness is too small, the decrease of reflectance caused by light interference of visible light is insufficient. If the film thickness is too large, the reflectance is dependent on generally only the reflection at interface between air and the film so that the decrease of reflectance caused by light interference of visible light tends to be insufficient. The suitable film thickness is selected so that the wavelength exhibiting a minimum value of reflectance of the article having the antireflective film is usually from 420 to 720 nm, preferably from 520 to 620 nm.

The antireflectively treated article wherein the surface treatment agent is applied to the substrate is explained hereinafter.

The type of article provided with the antireflective film of the present invention, that is, the substrate is not specifically limited. Examples of the substrate include an inorganic material such as glass, quartz glass, silicon, silicon oxide, stone, concrete and tile; a synthetic resin such as a vinyl chloride resin, polyethylene terephthalate, a cellulose resin such as triacetyl cellulose, a polycarbonate resin, a polyolefin resin, an acryl resin, a phenol resin, a xylene resin, a urea resin, a melamine resin, a diallyl phthalate resin, a furan resin, an amino resin, an alkyd resin, a urethane resin, a vinyl ester resin and a polyimide resin; a metal such as iron, aluminum and copper; wood, paper, print, photographic paper, and painting. The antireflective film is provided on the portions other than specific portions of the article so that the shape of the specific portions are floated by means of reflective light to improve the decorativeness of the article.

A transparent resin substrate such as an acrylic resin, a polycarbonate resin, a cellulose resin, polyethylene terephthalate and polyolefin resin is preferably used as the substrate to effectively exhibit the antireflectivity effect. The antireflective film is preferably provided also on an antiglaring (AG) substrate having an uneven resin surface made of these resins, whereby effectively exhibiting the antireflectivity effect.

The present invention is effective when it is applied to the following articles:
an optical part such as a prism, a lens sheet, a polarizing plate, an optical filter, a lenchcular lens, a fresnel lens, a screen of a rear projection-type display, an optical fiber and an optical coupler;
a transparent protective plate such as glass of a show window, glass of a show case, a cover for advertisement, and a cover for a photostand;
a protective plate for a CRT, a liquid crystal display, a plasma display, a rear projection-type display and the like;
a photorecording medium such as a photomagnetic disc, a read only type photodisc, e.g., CD, LD and DVD, a phase transfer photodisc such as PD, and hologram recording medium;
a photolithography-related member during semiconductor production such as a photoresist, a photomask, a pellicle, a reticule;
a protective cover for a illuminator such a halogen lamp, a fluorescent lamp and incandescence lamp; and
a sheet or film which is adhered to the above-mentioned articles.

The antireflective film of the present invention can be formed by coating the solution of copolymer (1) comprising the components (A) to (D) directly on the substrate, photo-irradiating the coating to give the cured coating film having the thickness of about 0.1 to 0.5 µm. At least one layer is provided as an undercoat on the substrate, and the antireflective film can be formed as a topcoat on the undercoat.

The effects of the undercoat roughly classified into three effects: to increase the scratch resistance of the topcoat, to protect the substrate and to increase the antireflectivity effect by adding a layer having a higher refractive index than the substrate. The increase of the scratch resistance of the topcoat can be achieved by a self-repairing undercoat as exemplified in JP-A-7-168005. The protection of the substrate can be achieved by using a paint which is generally called as a hardcoat. As the hardcoat, exemplified are a curable-type acrylic resin and epoxy resin, a cured material of a silicon alkoxide compound, and a cured material of a metal alkoxide compound. All of these can be thermally cured. For the acryl resin and the epoxy resin, a photonic (ultraviolet light) curing method is preferably in view of the productivity.

Static electricity is easily collected on the surface in the CRT and the plasma display because of apparatus characteristics. Accordingly, an additive for imparting the electrical conductivity to the undercoat and/or topcoat layer is preferably mixed. Examples of the additive are a polymer containing an ionic group such as —COO—, —$NH_2$, —$NH_3^+$, —$NR^{11}R^{12}R^{13}$ (wherein $R^{11}$, $R^{12}$ and $R^{13}$ are, for example, a methyl group, an ethyl group, a n-propyl group and a n-butyl group) and —$SO_3$—, a silicone compound, an inorganic electrolyte and a metal fine particle (for example, NaF, $CaF_2$, Ag, Cu and Au).

For the purpose of preventing the adhesion of dust, an antistatic agent is preferably added to the undercoat layer and/or topcoat layer of the antireflective film. Examples of the additive are a fine particle of metal oxide, a fluoroalkoxysilane and a surfactant (e.g., anionic, cationic, amphoteric and nonionic), in addition to the above-mentioned additive of imparting the electric conductivity.

The antistatic agent added to the undercoat is preferably a fine particle of metal oxide, for example, tin oxide doped with antimony (ATO) and tin oxide containing indium (ITO), since the effects continue for long time, the effects are not easily influenced by moisture, the antistatic effects are high, the transparency and the refractive index are high so that the refractive index of the substrate can be controlled, whereby increasing the antireflective effects. The AMO is preferable in view of the transparency, and the ITO is preferable in view of the antistatic effects and the electric conductivity. Even if the antistatic effects are not necessary, the antireflective effects are increased by the use of these additives, since the refractive index can be easily controlled.

Since the ATO and ITO easily scatter and absorb the light, the thickness of the undercoat is preferably in about submicron in order that the transmission of the light is not prevented. The thickness thereof is depending on the refractive index of the surface treatment agent and is preferably from 0.05 to 0.3 μm, in order that the wavelength dependency of the antireflectivity effects is small and the antireflectivity effects are increased over all wavelengths. The optimum refractive index is also depending on the refractive index of the surface treatment agent and is preferably from 1.55 to 1.95.

The hardcoat layer can be formed by coating a solution of alkylsilane and/or polysilazane, and then heating and curing the coating. Cured films of melamine crosslink and an ultraviolet light-curable acrylic paint can be also used.

The antireflective film of the present invention has the high fluorine content, the low surface contact angle, the water- and oil-repellency and soil releasability so that it has both antireflectivity and soil releasability.

The antireflective film of the present invention has pseudo-multilayer structure (or gradation structure) so that the film near the surface has a larger amount of fluorine atoms, the film near the substrate has a smaller amount of fluorine atoms, and the film near the center has a larger amount of an inorganic material (particularly, inorganics derived from metal alkoxide). The larger amount of organic material near the film center contributes to decrease of the reflectance of the film.

The method of forming the curable fluoropolymer thin film includes a method comprising coating the dispersion of the curable fluoropolymer, drying the coating and then optionally baking the coating to give a thin film; and a method comprising coating the solution of the curable fluoropolymer, drying the coating and then optionally baking the coating to give a thin film.

The solution coating is preferable, since the thin film can be easily formed. A conventional coating method can be adopted, insofar as the film thickness can be sufficiently controlled. For example, adopted are a roll coating method, a gravure coating method, a microgravure coating method, a flow coating method, a bar coating method, a spray coating method, a die coating method, a spin coating method and a dip coating method. The optimum coating method is determined with considering the balance of the productivity of the coating, the controllability of the film thickness and the yield. After the antireflective film is formed on a film, a sheet and the like, this may be adhered to the substrate.

PREFERRED EMBODIMENTS OF THE INVENTION

Hereinafter, the embodiments of the present invention are illustrated by Examples which do not limit the present invention limited by claims of the present application.

The "part" and "%" are respectively "parts by weight" and "% by weight", unless specified otherwise.

PREPARATION EXAMPLE 1

<Preparation of Perfluoroalkyl Group-Containing Fluorocompound (B); PFPEOS>

Into a 200 mL four-necked flask equipped with a stirrer, a dropping funnel, a condenser and a thermometer, a solution of ω-fluoropolyperfluorooxetane iodide compound (40 g) of the formula (a):

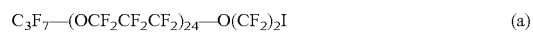

in hexafluorotetrachlorobutane (80 g) and di-t-butyl peroxide (1.5 g, $1\times10^{-2}$ mol), and then the flask was sufficiently replaced with a nitrogen gas. Vinyltrichlorosilane (16.1 g, 0.1 mol) was dropwise added from the dropping funnel under nitrogen stream. After the completion of the addition, the temperature of the system was increased to 120° C. to conduct the reaction for 4 hours. After the reaction, volatiles were completely distilled off under vacuum to give a silane compound having terminal iodine (38.7 g). In the same flask as the above, a solution of said silane compound (34.4 g) in perfluorohexane (50 g) was charged, zinc (2.1 g, $3.2\times10^{-2}$ mol) was intensely dispersed with stirring. The system was cooled over an ice-water bath, anhydrous methanol (10 g) was dropwise added under nitrogen stream. After the dropwise addition, the ice-water bath was removed off, the reaction was conduced under heated reflux for two hours. After the reaction, insolubles were filtered off, and a lower layer was removed by a separating funnel from a liquid phase having two layers. The resultant solution was washed three times with anhydrous methanol, and then volatiles were completely distilled off under vacuum to give a silane compound having a hydrogenated end (31.6 g) of the formula (b):

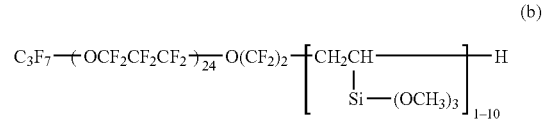

$^1$H-NMR showed a wide absorption band at 1.2 to 3.0 ppm derived from each hydrogen atom in the formula (c):

SYNTHESIS EXAMPLE 1

<Synthesis of Homopolymer of Fluorine-Containing Allyl Ether Having OH Group>

Into a 100 mL four-necked flask equipped with a stirrer and a thermometer, perfluoro(1,1,9,9-tetrahydro-2,5-bistrifluoromethyl-3,6-dioxanonenol):

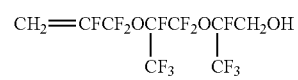

(20.4 g) and a 8.0% by weight solution (21.2 g) of

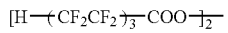

in perfluorohexane were charged, the nitrogen replacement was sufficiently conducted and then the system was stirred under nitrogen stream at 20° C. for 24 hours to generate a solid having a high viscosity.

A solution of the resultant solid in diethyl ether was poured into perfluorohexane, the separation was conducted, the separated matter was dried under vacuum to give a colorless transparent polymer (17.6 g).

The analysis of the polymer by a $^{19}$F-NMR analysis, a $^{1}$H-NMR analysis and an IR analysis revealed that the polymer was a fluoropolymer consisting of structural units of the above-mentioned fluorine-containing allyl ether and having a hydroxyl group at a side chain terminal. According to a GPC analysis using tetrahydrofuran (THF) as a solvent, the number-average molecular weight was 9,000 and the weight-average molecular weight was 22,000.

PREPARATION EXAMPLE 2

<Preparation of Adhesion Improvement Agent (C); P(MMA-TMSM)>

After a 150 mL internal volume of a stainless autoclave equipped with an electromagnetic stirrer was sufficiently replaced with a nitrogen gas, acetone (60 g), 3-methacryloxypropyl trimethoxysilane (TMSM) (5 g), methyl methacrylate (MMA) (20 g) and dilauroyl peroxide (LPO) (0.15 g) was charged and the temperature increase was initiated. The reaction was continued at 55° C. for 20 hours and then the reaction was discontinued. After the reaction mixture reached the room temperature, the resultant polymer solution was poured into methanol to precipitate the polymer. The polymer was washed with methanol and vacuum-dried at 50° C. to give 21 g of an adhesion improvement agent (C); P(MMA-TMSM). According to a GPC analysis using tetrahydrofuran (THF) as a solvent, the number-average molecular weight was 9,000 and the weight-average molecular weight was 20,000.

PREPARATION EXAMPLE 3

<Preparation of Fluoropolymer (D) Having Number-Average Molecular Weight of at Least 500; FAEH>

Into a 200 mL four-necked flask equipped with a stirrer, a dropping funnel, a condenser and a thermometer, diethyl ether (80 mL), a homopolymer of the fluorine-containing allyl ether having OH group prepared in Synthesis Example 1 (5.0 g) and pyridine (1.0 g) were charged, and cooled over ice to at most 5° C.

A solution of α-fluoroacrylic fluoride: $CH_2$=CFCOF (1.0 g) in diethyl ether (20 mL) was dropwise added for about 30 minutes under nitrogen stream with stirring. After the completion of the dropwise addition, the reaction was mixture was warmed to room temperature and the stirring was continued for 4.0 hours.

The reacted ether solution was charged into a separation funnel; washed with water, 2% aqueous hydrochloride, 5% aqueous NaCl, and water; and dried over anhydrous magnesium sulfate. An ether solution was separated by filtration.

A $^{19}$F-NMR analysis of the ether solution revealed that a copolymer had a ratio of —OC(=O)CF=$CH_2$ group-containing fluorine-containing allyl ether/OH group-containing fluorine-containing allyl ether=40/60 by mol.

An IR analysis of a cast film prepared by coating the solution on a NaCl plate and drying at room temperature showed an absorption of a carbon-carbon double bond of 1661 cm$^{-1}$ and an absorption of a C=O group of 1770 cm$^{-1}$.

COMPARATIVE PREPARATION EXAMPLE 1

<Preparation of Fluoropolymer; PFHBVE>

After a 150 mL internal volume of a stainless autoclave equipped with an electromagnetic stirrer was sufficiently replaced with a nitrogen gas, acetone (60 g), ethyl vinyl ether (EVE) (5.8 g), 2-hydroxyethyl vinyl ether (HEVE) (3.0 g) and dilauroyl peroxide (LPO) (0.15 g) were charged and cooled over dry ice-methanol to −40° C. The autoclave was replaced again with a nitrogen gas to remove off oxygen in the autoclave. Hexafluoropropylene (HFP) (15.0 g) was added and the temperature increase was initiated. At the time that the temperature of the content in the autoclave reached 55° C., the pressure was 4.7 kgf/cm$^2$. Then the reaction was continued at 55° C. for 20 hours. At the time that the pressure reached 2.5 kgf/cm$^2$, the autoclave was cooled with water to discontinue the reaction. After the reaction mixture reached the room temperature, the unreacted monomer was released and the autoclave was opened to give a polymer solution. The resultant polymer solution was poured into n-hexane to precipitate the polymer. The polymer was washed with n-hexane, vacuum-dried at 50° C. to give 12.6 g of a fluorocopolymer, PFHBVE.

According to a Gel permeation chromatography of a 0.5% solution of this fluorocopolymer, PFHBVE in tetrahydrofuran (THF), the number-average molecular weight of the fluorocopolymer was 39,000 in terms of polystyrene.

COMPARATIVE PREPARATION EXAMPLE 2

<Preparation of Fluoropolymer; P17FA>

After a 150 mL internal volume of a stainless autoclave equipped with an electromagnetic stirrer was sufficiently replaced with a nitrogen gas, acetone (60 g), perfluorooctylethyl acrylate (17FA) (10 g) and dilauroyl peroxide (LPO) (0.15 g) were charged and the temperature increase was initiated. The reaction was continued at 55° C. for 20 hours and then discontinued. After the reaction mixture reached the room temperature, the resultant polymer solution was poured into methanol to precipitate the polymer. The polymer was washed with methanol, vacuum-dried at 50° C. to give 9.1 g of a fluorocopolymer, P17FA.

PREPARATIVE PREPARATION EXAMPLE 3

<Preparation of Fluoropolymer; αF-PHFIP>

After a 150 mL internal volume of a stainless autoclave equipped with an electromagnetic stirrer was sufficiently replaced with a nitrogen gas, acetone (60 g), α-fluorohexafluoroisopropyl acrylate (αF-HFIP) (10 g) and a 8.0% by weight solution (2 g) of $[H(CF_2CF_2)_3COO]_2$ in perfluorohexane were charged and the reaction was continued at room temperature for 20 hours. The resultant polymer solution was poured into hexane to precipitate the polymer. The polymer was washed with hexane, vacuum-dried at 50° C. to give 9.1 g of a fluoropolymer, αF-PHFIP.

EXAMPLE 1

<Preparation of Coating Composition>

In a 100 mL flask equipped with a stirrer, a thermometer and a dropping funnel, to tetraethoxysilane [$Si(OCH_2CH_3)_4$] (TEOS; the component (A)) (manufactured by Shin-Etsu Chemical Co., Ltd.) (24.4 parts), added were heptadecafluoro-1,1,2,2-tetrahydrodecyltriethoxysilane [$CF_3(CF_2)_7CH_2CH_2$—$Si(OCH_2CH_3)_3$] (PFOS; the component (B)) (manufactured by Shin-Etsu Chemical Co., Ltd.) (7.4 parts), pure water (22.7 g), ethanol (44 g), a catalyst (nitric acid) (0.05 g) and polymethacrylic acid (PMAA; the component (C)) (1.2 parts). The mixture was subjected to hydrolysis and polycondensation reactions at room temperature for 12 hours. The resultant compounds were diluted with the reaction solvent to give a solution coating composition having an effective concentration of 3%.

<Preparation of Coating Film>

The above-mentioned coating composition was coated on an untreated PET substrate by a spin coater at room temperature and the number of revolutions of 500 to 2000 rpm, and dried at room temperature for 5 minutes. During the coating, the number of revolution of the spin coater was adjusted so that the thickness of a dried film was from 90 to 110 nm.

<Light Irradiation>

After dried at room temperature, the film was irradiated with ultraviolet light by a high-pressure mercury lamp at room temperature and the intense of 3,000 $mJ/cm^2U$.

<Optical Evaluation of Coating Film>

Measurement of Refractive Index

As the optical characteristics evaluation, a sample which was prepared by coating a solution of the above-mentioned composition in MIBK by a spin coater on a PET film to give a dried film having a thickness of about 0.1 μm was subjected to a refractive index ($n_d^{25}$) measurement for light having a wavelength of 550 nm by using an Abbe refractometer at 25° C.

Measurement of Transmittance and Reflectance

The transmittance of light having a wavelength of 400 nm to 700 nm was measured on a sample of the resultant coating film by using a spectrophotometer equipped with a 60 mm integrating sphere (U-3410 type, manufactured by Hitachi, Ltd.).

The reflectance of light having a wavelength of 400 nm to 700 nm was determined by positioning the sample on a visible light-ultraviolet light spectrometer equipped with an acrylic plate 50° regular reflection unit.

Measurement of Graded Refractive Index Distribution

The graded refractive index distribution was measured on the sample of the resultant coating film by multi-angle spectroscopic ellipsometer (M-2000: manufactured by JA Woollam Japan). A variable angle spectroscopic ellipsometry (VASE) polarization analysis was used as an analysis software.

<Physical Properties of Coating Film>

Measurement of Pencil Hardness

The pencil hardness was measured according to JIS K5400.

Adhesion Test

The adhesion of the coating film to the substrate was evaluated by a scratch resistance of a film sample having the above mentioned cured film. That is, the surface of the coating film was repeatedly rubbed 25 times under a load of 1 $kg/cm^2$ by using "KIMWIPE" (manufactured by Jujo Kimberly, K. K.), and whether the evolution of scratches on the surface was present or not was visually observed. The state of no peeling of the cured film and no scratch is expressed as "⊚", the state of shallow and linear scratches on a part of the cured film is expressed by "◯", the state of scratches on whole surface of the cured film is expressed as "Δ", and the state of peeling of the cured film on whole surface is expressed as "X".

Contact Angle of Water and n-hexadecane

Using a contact angle meter (CA-A type: manufactured by Kyowa Kaimen Kagagu K. K.), a particle of water or n-hexadecane having a diameter of 1 mm was prepared on a tip of a needle at room temperature, the particle was contacted with a substrate surface to give a liquid droplet on the surface. An angle between the substrate surface and the droplet surface was measured, which was taken as the contact angle.

Soil Releasability

A line was drawn on a substrate surface by a black felt pen, and wiped off by a cellulose non-woven fabric. The easiness of removal of line was visually observed. A determination criterion was as follows:

⊚: Black oily ink can be completely wiped off for one wipe.

◯: Black oily ink can be completely wiped off for at most three wipes.

Δ: A wipe-off trace slightly remains.

X: A wipe off trace is spread so that removal is impossible.

Mechanical Durability

The mechanical durability was measured by using ultra-thin film scratch tester (SCRATCH TESTER CSR-02 manufactured by Rhesca Company, Ltd.) according to JIS R-3255. The bond strength between a thin film surface and a substrate was visually observed by scratching by means of a diamond vibration needle.

◯: No flaw when scratched under a load of 0.1–10 $mN/mm^2$.

Δ: Slight flaw when scratched under a load of 0.1–10 $mN/mm^2$.

X: flaws spread and coating film peels off when scratched under a load of 0.1–10 $mN/mm^2$.

Atoms Present in Coating Film

The presence amount of each of a fluorine atom, a carbon atom and a silicon atom in depth direction of the coating film was determined by a X-ray photoelectron spectrometry (ESCA)

EXAMPLES 2 to 10 and COMPARATIVE EXAMPLES 1 to 4

A coating composition and a coating film were prepared and various physical properties were measured in the same manner as in Example 1 except that the composition was replaced with those shown in Table 1. The results are shown in Table 2.

Figure 2:
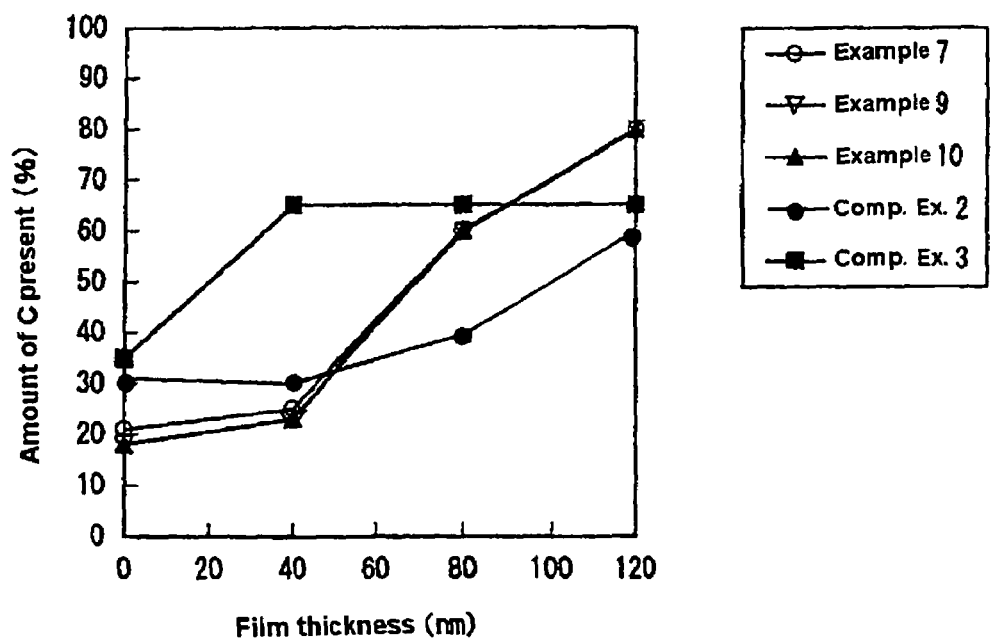
FIG. 2 shows a graph showing the presence amount of a carbon atom in depth direction of the film measured by an X-ray photoelectron spectroscopy for the coating films obtained in Examples 7, 9 and 10 and Comparative Examples 2 and 3.
Figure 3:
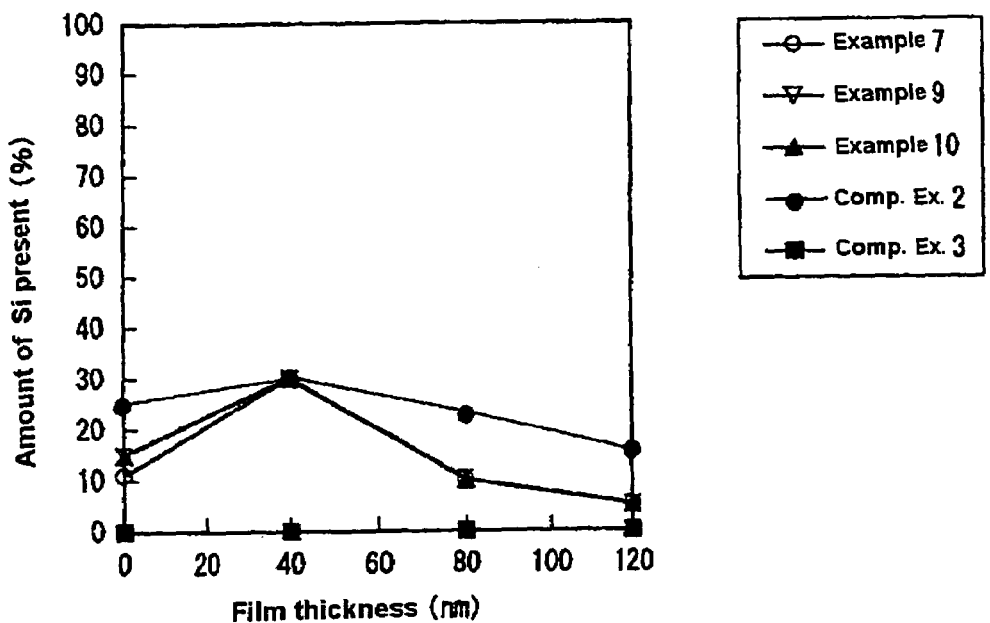
FIG. 3 shows a graph showing the presence amount of a silicon atom in depth direction of the film measured by an X-ray photoelectron spectroscopy for the coating films obtained in Examples 7, 9 and 10 and Comparative Examples 2 and 3.
Figure 4:
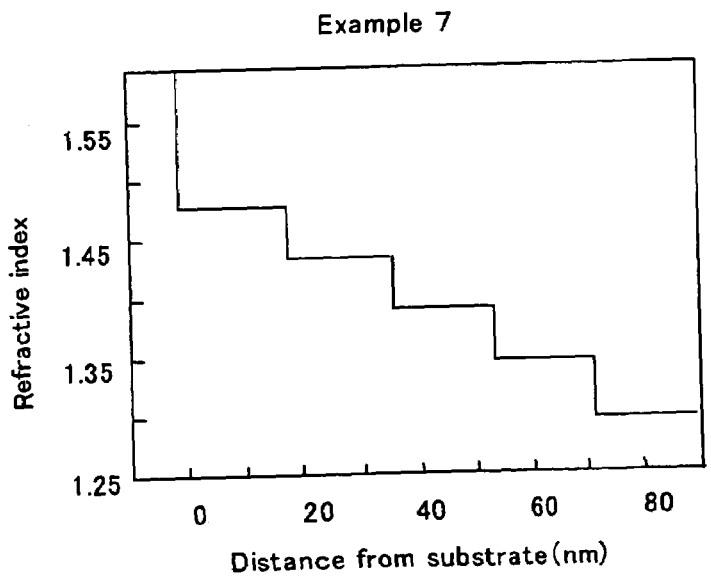
FIGS. 4 and 5 show graphs showing a refractive index distribution in depth direction of the film measured by a multi-incident-type spectroscopic ellipsometer for the coating films obtained in Example 7 and Comparative Example 4.
Figure 5:
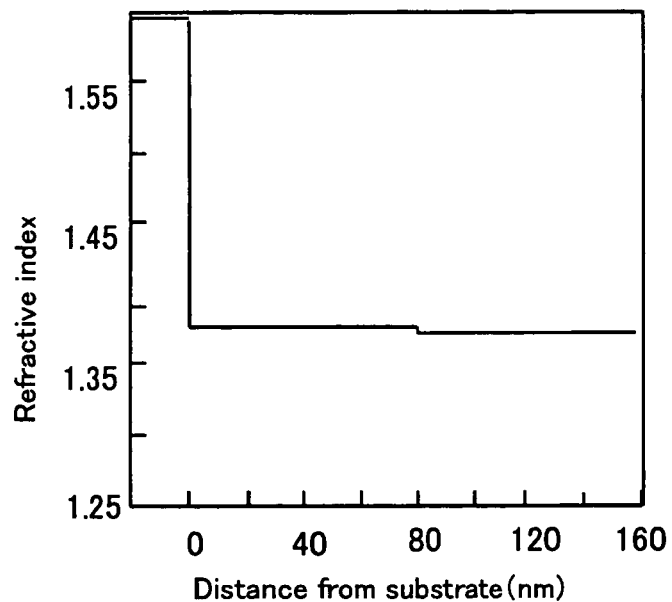
Figure 6:
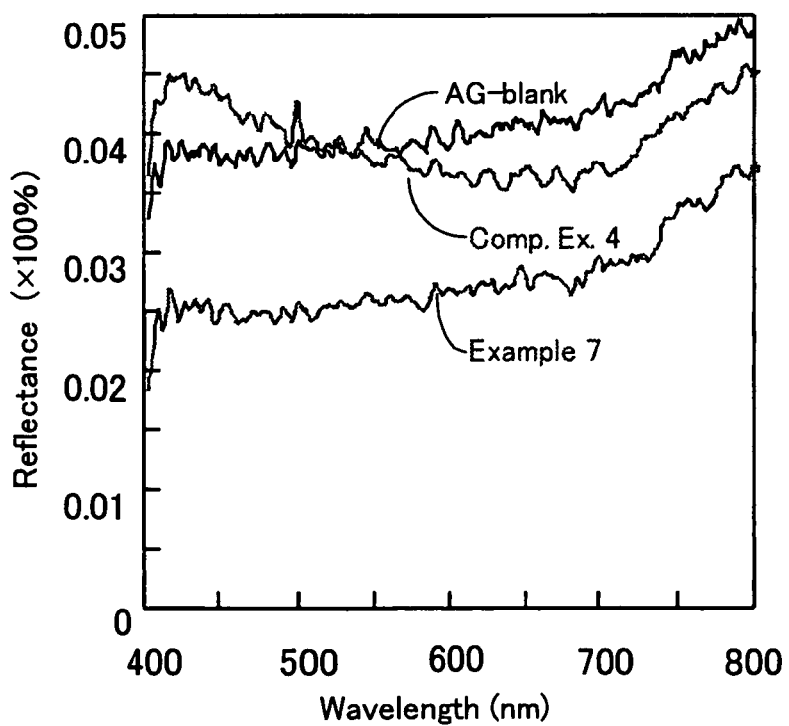
FIGS. 6 and 7 show graphs showing a reflectance of the film measured by a reflectometer for the coating films obtained in Example 7 and Comparative Example 4.
Figure 7:
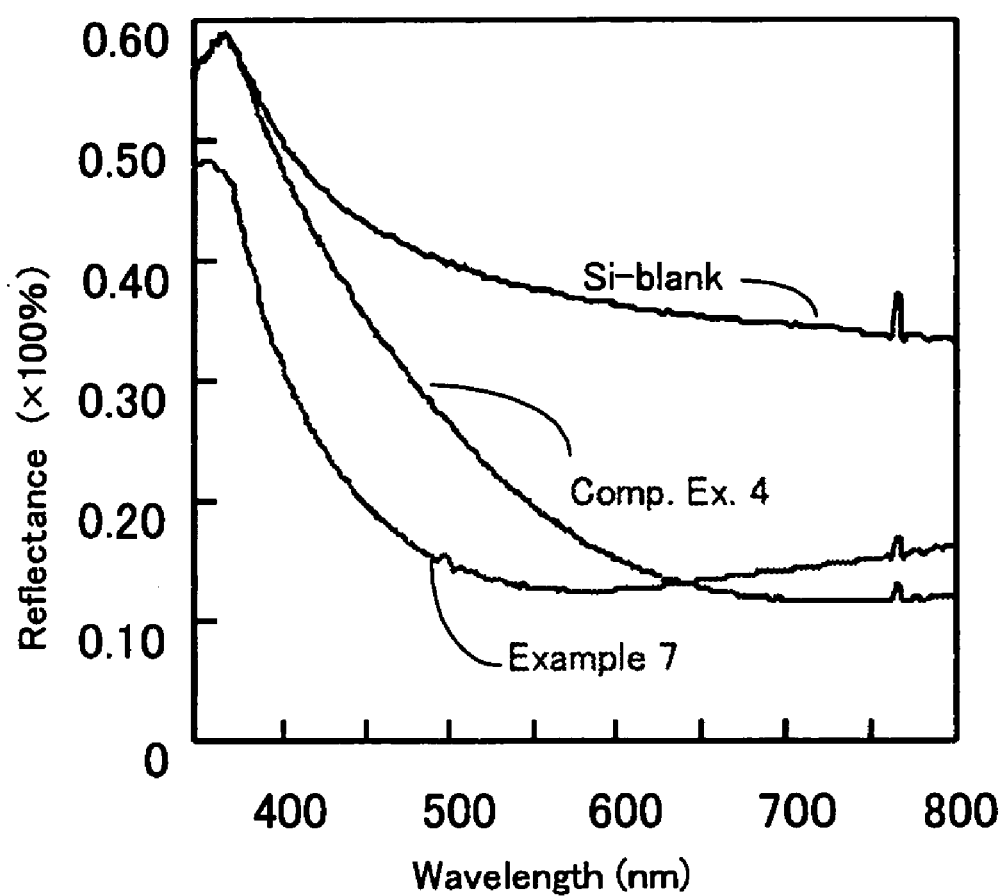

As to the coating films prepared by Examples 7, 9 and 10 and Comparative Examples 2 and 3, the presence amount of each of a fluorine atom, a carbon atom and a silicon atom in depth direction of the coating film was determined by a X-ray photoelectron spectrometry. As to the coating films prepared in Example 7 and Comparative Example 4, the graded refractive index distribution and the reflectance were determined. The results are shown in FIGS. 1 to 7.

Abbreviations in the Tables have the following meanings:

Component (A)
TEOS: Tetraethoxysilane
NCOTSM: Isocyanatopropyltriethoxysilane

Component (B)
PFOS: Heptadecafluoro-1,1,2,2-tetrahydrodecyltriethoxysilane
PFPEOS: Perfluoroethersilane Component (C)
PMAA: Polymethacrylic acid
P(MMA-TMSM): Methyl methacrylate/3-methacryloxypropyltrimethoxysilane copolymer
P(MMA-TMSM)-PDMS: One end OH-modified dimethyl silicone-containing copolymer Component (D)
FAEH: Fluorine-containing allyl ether copolymer Fluoropolymer
PFHBVE: Hexafluoropropylene/hydroxybutyl vinyl ether/ethyl vinyl ether copolymer
P17FA: Polyperfluorooctylethyl acrylate
αF-PHFIP: Poly-α-fluoro-hexafluoroisopropyl acrylate Effect of Invention The present invention provides a cured film having excellent transparency and durability while maintaining excellent soil releasability and low refractive index. Thus the surface treatment agent of the present invention particularly provide an optical material such as an antireflective film, a highly reflective film and a selectively transmission film; an optical lens, a hardcoat of an optical lens, a protective film of a display element, a coating reinforcing material of fibers, an optically three-dimensional shaping resin, a paint for metal, a sizing agent such as a slate material, a hard coat of plastic, a hardcoat of print paper, a soil release film for a floor and a wall tile, an actuator, an optical fiber, pellicle, a sealant for semiconductor, an insulating film for semiconductor, an adhesive for semiconductor, an optical adhesive, an print plate material, a photonics material such as a light waveguide material and a light switching material. In addition, the surface treatment agent exhibits excellent radiation curability.

The surface treatment agent of the present invention can provide an antireflective film having the improved scratch resistance with maintaining the soil releasability and the antireflectivity effect; and an antireflective article having said antireflective film coated thereon.

TABLE 1

|  |  |  | Example |  |  |  |  |  |  |  |  |  | Comp. Example |  |  |  |
|---|---|---|---|---|---|---|---|---|---|---|---|---|---|---|---|---|
|  |  |  | 1 | 2 | 3 | 4 | 5 | 6 | 7 | 8 | 9 | 10 | 1 | 2 | 3 | 4 |
| Mixture Component | Component (A) | TEOS | 24.4 | 24.4 | 24.4 | 24.4 | 24.4 | 24.4 | 22.6 | 22.6 | 22.6 | 22.6 | 24.7 | 24.7 |  |  |
|  |  | NCOTSM |  |  |  |  |  |  | 0.1 | 0.1 | 0.1 | 0.1 |  | 0.1 |  |  |
|  | Component (B) | PFOS | 7.4 | 7.4 |  | 7.4 | 7.4 |  |  |  |  |  | 7.5 |  |  |  |
|  |  | PFPEOS |  |  | 7.4 |  |  | 7.4 | 6.9 | 6.9 | 6.9 | 6.9 |  |  |  |  |
|  | Component (C) | PMAA | 1.2 |  |  | 1.1 |  |  | 1.1 | 1 |  |  |  |  |  |  |
|  |  | P(MMA-TMSM) |  | 1.2 | 1.2 |  | 1.1 | 1.1 |  |  | 1.1 | 1.0 |  |  |  |  |
|  |  | P(MMA-TMSM)-PDMS |  |  |  | 0.1 | 0.1 | 0.1 |  | 0.1 |  | 0.1 |  |  |  |  |
|  | Component (D) | FAEH |  |  |  |  |  |  | 6.9 | 6.9 | 6.9 | 6.9 |  |  |  |  |
|  | Fluoropolymer | PFHBVE |  |  |  |  |  |  |  |  |  |  |  | 7.4 |  |  |
|  |  | P17FA |  |  |  |  |  |  |  |  |  |  |  |  | 55.5 |  |
|  |  | αF-PHFIP |  |  |  |  |  |  |  |  |  |  |  |  |  | 55.5 |
|  | Catalyst | Cat. | 0.3 | 0.3 | 0.3 | 0.3 | 0.3 | 0.3 | 0.3 | 0.3 | 0.3 | 0.3 | 0.3 | 0.3 |  |  |
|  | Pure water | Water | 22.7 | 22.7 | 22.7 | 22.7 | 22.7 | 22.7 | 21.1 | 21.1 | 21.1 | 21.1 | 23 | 23 |  |  |
|  | Solvent | EtOH | 44 |  |  | 44 |  |  |  |  |  |  | 44.5 |  |  |  |
|  |  | Acetone |  | 44 | 10 |  | 44 | 44 | 10 | 10 | 10 | 10 |  | 44.5 |  | 44.5 |
|  |  | HCFC225 |  |  | 34 |  |  |  | 31 | 31 | 31 | 31 |  |  | 44.5 |  |

TABLE 2

|  | Example |  |  |  |  |  |  |  |  |  | Comp. Example |  |  |  |
|---|---|---|---|---|---|---|---|---|---|---|---|---|---|---|
|  | 1 | 2 | 3 | 4 | 5 | 6 | 7 | 8 | 9 | 10 | 1 | 2 | 3 | 4 |
| Refractive Index | 1.40 | 1.40 | 1.40 | 1.40 | 1.40 | 1.40 | 1.37 | 1.37 | 1.37 | 1.37 | 1.40 | 1.40 | 1.37 | 1.36 |
| Pencil Hardness | 2H | 2H | 2H | 2H | 2H | 2H | 2H | 2H | 2H | 2H | 2H | 2H | 4B | B |
| Transmittance (%) | 95 | 95 | 95 | 95 | 95 | 95 | 95 | 95 | 95 | 95 | 95 | 95 | 95 | 95 |
| Reflectance (%) | 1.5 | 1.5 | 1.5 | 1.5 | 1.5 | 1.5 | 1.0 | 1.0 | 1.0 | 1.0 | 1.5 | 3.0 | 2.0 | 3.5 |
| Adhesion Test | ○ | ◎ | ◎ | ○ | ◎ | ◎ | ○ | ○ | ◎ | ◎ | x | ○ | x | x |
| Contact Angle (Water; °) | 105 | 105 | 105 | 105 | 105 | 105 | 105 | 105 | 105 | 105 | 105 | 65 | 105 | 100 |
| (n-Hexadecane; °) | 75 | 75 | 75 | 75 | 75 | 75 | 75 | 75 | 75 | 75 | 75 | 40 | 75 | 65 |
| Soil releasability | ○ | ○ | ○ | ◎ | ◎ | ◎ | ○ | ◎ | ○ | ◎ | ○ | x | ○ | ○ |
| Mechanical durability | Δ | ○ | ○ | Δ | ○ | ○ | Δ | Δ | ○ | ○ | x | ○ | x | x |

The invention claimed is:

1. A surface treatment agent comprising:
   (A) a hydrolyzable metal alkoxide or a hydrolyzate thereof,
   (B) a fluorocompound containing a perfluoroalkyl group and a functional group reactive with the hydrolyzable metal alkoxide (A),
   (C) an adhesion improvement agent, and
   (D) a fluoropolymer having a number-average molecular weight of at least 500,
   wherein a one-layer film formed from the surface treatment agent has a graded refractive index structure, and the fluoropolymer (D) is a polymer of the general formula (3):

$$-(M)_x-(N)_y-$$

wherein x and y are from 1 to 500,
   the structural unit M is derived from a fluorine-containing ethylenic monomer and is a structural unit derived from a fluorine-containing ethylenic monomer of the formula (M):

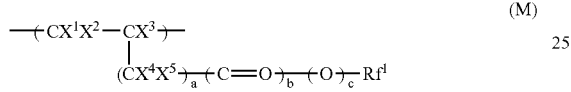

(in which, $X^1$ and $X^2$ are, the same or different, H or F, $X^3$ is H, F, $CH_3$ or $CF_3$,
   $X^4$ and $X^5$ are, the same or different, H, F or $CH_3$,
   $Rf^1$ is an organic group wherein 1 to 3 $Y^3$ groups ($Y^3$ is a hydroxyl group, a glycidyl group, an amino group, an alkoxy group, a carboxyl group, an isocyanate group, or a $C_1$–$C_{10}$ monovalent organic group having at least one of these reactive groups) are bonded to a $C_1$–$C_{40}$ fluorine-containing alkyl group or a $C_2$–$C_{100}$ fluorine-containing alkyl group having an ether linkage,
   a is an integer of from 0 to 3, and
   b and c are, the same or different, 0 or 1), and
   the structural unit N is a structural unit obtained by reacting an unsaturated carboxylic acid of the formula (A):

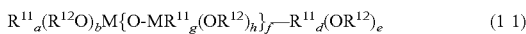

(in which $R^1$ is a divalent organic group having 1 to 7 carbon atoms, which may be substituted with a fluorine atom,
   $X^6$ is H, F, $CH_3$ or $CF_3$,
   $X^7$ and $X^8$ are, the same or different, H or F, and
   f is 0 or 1),
   or a derivative thereof, with the $Y^3$ group in the $Rf^1$ group of the ethylenic monomer giving the structural unit M.

2. The surface treatment agent according to claim 1, wherein the component (A) is a hydrolyzable metal alkoxide of the general formula (1) or a hydrolyzate thereof:

wherein each $R^{11}$ is an alkyl group, a methacryloxy group, an acryloxy group, a vinyl group-containing organic group, an aryl group, an amino group, a glycidyl group, an isocyanate group, or a carboxyl group-containing organic group, each $R^{12}$ is an alkyl group, an alkoxyalkyl group, or an aryl group,
   M is a metal,
   a is from 0 to 3, b is from 0 to 4, a+b is from 2 to 4, d is 1 or 0, e is 1 or 0, d+e is 1, f is from 0 to 10, g is 0 to 3, h is 0 to 3, g+h is from 1 to 3, at least one of b, e and h is at least 1.

3. The surface treatment agent according to claim 1, wherein the component (B) is a perfluoroalkyl group-containing fluorocompound of the general formula (2):

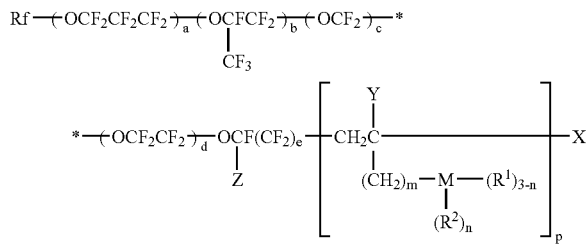

wherein Rf is a linear or branched perfluoroalkyl group having 1 to 16 carbon atoms,
   X is an iodine atom or a hydrogen atom,
   Y is a hydrogen atom or a lower alkyl group,
   Z is a fluorine atom or a trifluoromethyl group,
   $R^1$ is a hydrolyzable group, or a chlorine atom,
   $R^2$ is a hydrogen atom or an inert monovalent organic group,
   a, b, c and d are an integer of from 0 to 200,
   e is 0 or 1,
   m and n are from 0 to 2,
   p is an integer of from 1 to 10, and
   M is a metal, or a reactive group selected from the group consisting of an isocyanate group, a carboxyl group, a hydroxyl group, a glycidyl group, a phosphate group, a sulfonate group and an amino group.

4. The surface treatment agent according to claim 1, wherein the adhesion improvement agent (C) is a compound having a surface free energy of at least 10 mJ/m².

5. The surface treatment agent according to claim 1, wherein the adhesion improvement agent (C) is a fluorine-free olefin polymer having a number-average molecular weight of at least 500.

6. The surface treatment agent according to claim 1, wherein the adhesion improvement agent (C) is a polymer having a polysiloxane segment having a number-average molecular weight of at least 500 in a side chain.

7. The surface treatment agent according to claim 1, wherein a coating film layer contacting with air interface formed from the surface treatment agent has a refractive index of at most 1.50.

8. The surface treatment agent according to claim 1, which further contains an active energy ray cure initiator.

9. A film obtained by photocuring the surface treatment agent according to claim 8.

10. An antireflective film obtained by photocuring the surface treatment agent according to claim 8.

11. An antireflectively treated article comprising a substrate and on the substrate the antireflective film according to claim 10, wherein the substrate is made of at least one selected from the group consisting of an acrylic resin, polycarbonate, polyethylene terephthalate, triacetylcellulose and polyolefin.

* * * * *